US012670189B1

(12) United States Patent
Guggenmos et al.

(10) Patent No.: US 12,670,189 B1
(45) **Date of Patent: *Jun. 30, 2026**

(54) SYSTEMS AND METHODS OF GENERATING AND TRANSFORMING DATA SETS FOR ENTITY COMPARISON

(71) Applicant: Federal Home Loan Mortgage Corporation (Freddie Mac), McLean, VA (US)

(72) Inventors: Steven Guggenmos, Herndon, VA (US); Jun Li, Potomac, MD (US); Benjamin Schweitzer, Washington, DC (US); Jae-kyun Patrick Chu, Reston, VA (US); Dina Guo, McLean, VA (US); Biao Yang, Vienna, VA (US); Evguenia Yerukhimovich, Ashburn, VA (US)

(73) Assignee: Federal Home Loan Mortgage Corporation (Freddie Mac), McLean, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 19/053,984

(22) Filed: Feb. 14, 2025

Related U.S. Application Data

(63) Continuation of application No. 17/085,486, filed on Oct. 30, 2020, now Pat. No. 12,254,030.

(Continued)

(51) Int. Cl.
*G06Q 30/0207* (2023.01)
*G06F 16/29* (2019.01)
(Continued)

(52) U.S. Cl.
CPC ............ *G06F 16/29* (2019.01); *G06F 18/214* (2023.01); *G06N 20/00* (2019.01);
(Continued)

(58) Field of Classification Search
CPC ........... G06Q 30/0207; G06Q 30/0629; G06Q 30/0631
See application file for complete search history.

(56) References Cited

U.S. PATENT DOCUMENTS 8,341,089 B2 * 12/2012 Fassio .................... G06Q 10/10 705/314
11,093,992 B2 * 8/2021 Wang ................ G06Q 30/0641
(Continued)

OTHER PUBLICATIONS

Glaeser, et al., "Nowcasting Gentrification: Using Yelp Data to Quantify Neighborhood Change", Harvard Business School, Working Paper 18-077, 2018, pp. 1-11.
(Continued)

*Primary Examiner* — Azam A Ansari
(74) *Attorney, Agent, or Firm* — Secant IP, PLLC

(57) ABSTRACT

In an illustrative embodiment, automated systems and methods identify relationships between property features and property quality using customized features sets. Filtered feature sets for properties may be generated, containing feature values representing physical attributes and neighborhood attributes. Machine learning model(s) may be trained with the filtered feature data sets to identify correlations between individual features and relative importance to the feature in determining property quality. The model(s) may be used to identify a set of significant features applicable to performing comparisons between comparable properties.

20 Claims, 20 Drawing Sheets

Related U.S. Application Data

(60) Provisional application No. 62/928,990, filed on Oct. 31, 2019.

(51) Int. Cl.

| | |
|---|---|
| ***G06F 18/214*** | (2023.01) |
| ***G06N 20/00*** | (2019.01) |
| ***G06Q 30/0601*** | (2023.01) |
| ***G06Q 40/03*** | (2023.01) |
| ***G06Q 50/16*** | (2012.01) |

(52) U.S. Cl.

CPC ..... *G06Q 30/0629* (2013.01); *G06Q 30/0631* (2013.01); *G06Q 40/03* (2023.01); *G06Q 50/16* (2013.01); *G06Q 30/0207* (2013.01)

(56) References Cited

U.S. PATENT DOCUMENTS

| | | | | |
|---|---|---|---|---|
| 11,308,564 | B2 * | 4/2022 | Ye | G06N 20/20 |
| 11,373,257 | B1 * | 6/2022 | Guo | G06N 20/00 |
| 2014/0201093 | A1 | 7/2014 | Bishop, III et al. | |
| 2015/0317400 | A1 | 11/2015 | Charkov et al. | |
| 2018/0165758 | A1 | 6/2018 | Saxena et al. | |
| 2019/0311301 | A1 * | 10/2019 | Pyati | G06F 16/901 |
| 2020/0074873 | A1 | 3/2020 | Alsarhan et al. | |

OTHER PUBLICATIONS

Chen, et al., "XGBoost: A Scalable Tree Boosting System", KDD '16 Proceedings of the 22nd ACM SIGKDD International Conference on Knowledge Discovery and Data Mining, Aug. 2016, pp. 785-794.

Gower, J.C., "A General Coefficient of Similarity and Some of Its Properties", Biometrics, vol. 27, No. 4, Dec. 1971, pp. 857-871.

* cited by examiner

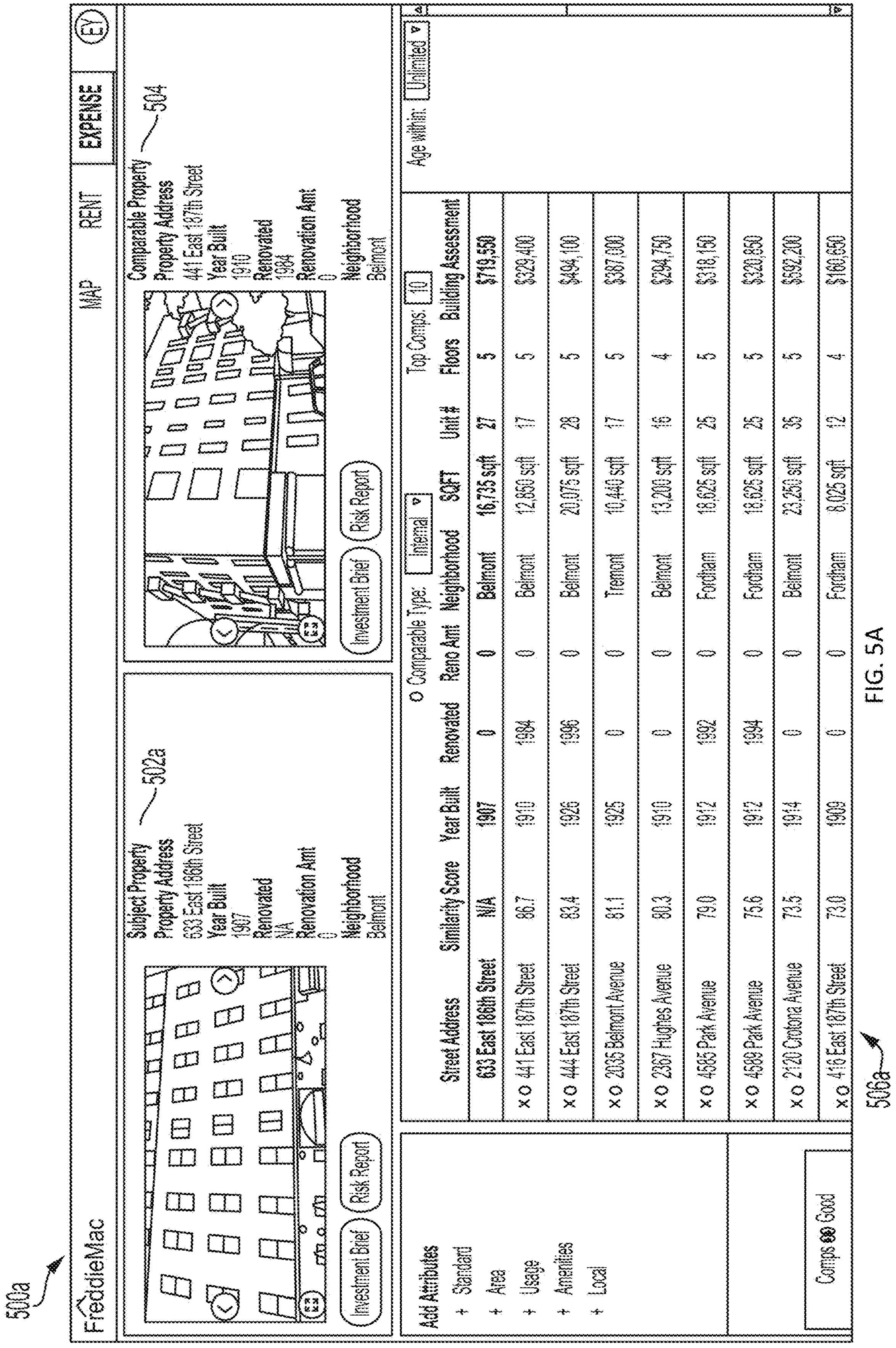

FIG. 5A

FreddieMac

MAP    RENT    EXPENSE    EY

Investment Brief    Risk Report

Subject Property — 502a
Property Address
633 East 186th Street
Year Built
1907
Renovated
N/A
Renovation Amt
0
Neighborhood
Belmont Comparable Property — 504
Property Address
441 East 187th Street
Year Built
1910
Renovated
1984
Renovation Amt
0
Neighborhood
Belmont Investment Brief    Risk Report Add Attributes
+ Standard
+ Area
+ Usage
+ Amenities
+ Local ○ Comparable Type: Internal ▾    Top Comps: 10    Age within: Unlimited ▾

| Street Address | Similarity Score | Year Built | Renovated | Reno Amt | Neighborhood | SQFT | Unit # | Floors | Building Assessment |
|---|---|---|---|---|---|---|---|---|---|
| 633 East 186th Street | N/A | 1907 | 0 | 0 | Belmont | 16,735 sqft | 27 | 5 | $719,550 |
| ✕ ○ 441 East 187th Street | 86.7 | 1910 | 1984 | 0 | Belmont | 12,860 sqft | 17 | 5 | $329,400 |
| ✕ ○ 444 East 187th Street | 83.4 | 1926 | 1996 | 0 | Belmont | 20,075 sqft | 28 | 5 | $494,100 |
| ✕ ○ 2035 Belmont Avenue | 81.1 | 1925 | 0 | 0 | Tremont | 10,440 sqft | 17 | 5 | $387,000 |
| ✕ ○ 2367 Hughes Avenue | 80.3 | 1910 | 0 | 0 | Belmont | 13,200 sqft | 16 | 4 | $284,750 |
| ✕ ○ 4685 Park Avenue | 79.0 | 1912 | 1992 | 0 | Fordham | 18,626 sqft | 25 | 5 | $318,160 |
| ✕ ○ 4589 Park Avenue | 75.6 | 1972 | 1994 | 0 | Fordham | 18,625 sqft | 25 | 5 | $320,850 |
| ✕ ○ 2120 Crotona Avenue | 73.5 | 1914 | 0 | 0 | Belmont | 23,260 sqft | 35 | 5 | $592,200 |
| ✕ ○ 416 East 187th Street | 73.0 | 1909 | 0 | 0 | Fordham | 8,025 sqft | 12 | 4 | $160,650 |

506a

Comps ●● Good

500a

600a

MAP   RENT   EXPENSE   (EY)

☐ 2yr ☐ 1yr ☐ YTD ☐ appraisal 602a   604a   606a

| Expense Type | lender pro-forma | Underwritten Expenses for the Comps | | | | Servicing Expenses for the Comps | | | | UW vs Svc Delta |
| --- | --- | --- | --- | --- | --- | --- | --- | --- | --- | --- |
| | | # of loans 10 | | | | # of loans 9 | | | | |
| | | mean | median | max | min | mean | median | max | min | delta |
| Real Estate Taxes | $1,175 | $1,745 | $1,696 | $2,085 | $999 | $1,788 | $1,632 | $2,784 | $951 | -2% |
| Insurance | $653 | $372 | $344 | $625 | $201 | $409 | $302 | $769 | $201 | -10% |
| Utilities/W&S | $1,838 | $1,921 | $1,910 | $2,285 | $1,785 | $1,951 | $2,264 | $3,676 | $881 | -2% |
| Total Fixed Expenses | $5,667 | $4,038 | $3,953 | $5,184 | $3,213 | $4,147 | $4,308 | $5,934 | $2,388 | -3% |
| R&M | $306 | $505 | $516 | $625 | $400 | $0 | $0 | $0 | $0 | 100% |
| Management | $491 | $509 | $484 | $686 | $432 | $551 | $522 | $870 | $415 | -8% |
| Payroll | $463 | $418 | $351 | $853 | $880 | $732 | $841 | $1,498 | $0 | -75% |
| G&A | $50 | $152 | $150 | $225 | $105 | $124 | $91 | $528 | $0 | 19% |
| Miscellaneous | $0 | $10 | $10 | $95 | $0 | $0 | $0 | $0 | $0 | 100% |
| Total Operating Expenses | $1,510 | $1,593 | $1,571 | $2,102 | $1,293 | $1,407 | $1,273 | $2,025 | $909 | 12% |
| Replacement Reserves | $288 | $262 | $250 | $325 | $250 | $0 | $0 | $0 | $0 | 100% |
| Total Expenses & Reserves | $7,465 | $5,894 | $5,768 | $7,034 | $4,980 | $6,789 | $6,723 | $8,957 | $4,931 | -15% |
| Expense Ratio | 46% | 38% | 37% | 44% | 33% | 43% | 43% | 53% | 33% | -13% |
| Management Fee % | 3% | 3% | 3% | 5% | 3% | 4% | 3% | 6% | 3% | -8% |

Per Unit | Per Square Feet   Export

← Back to comps

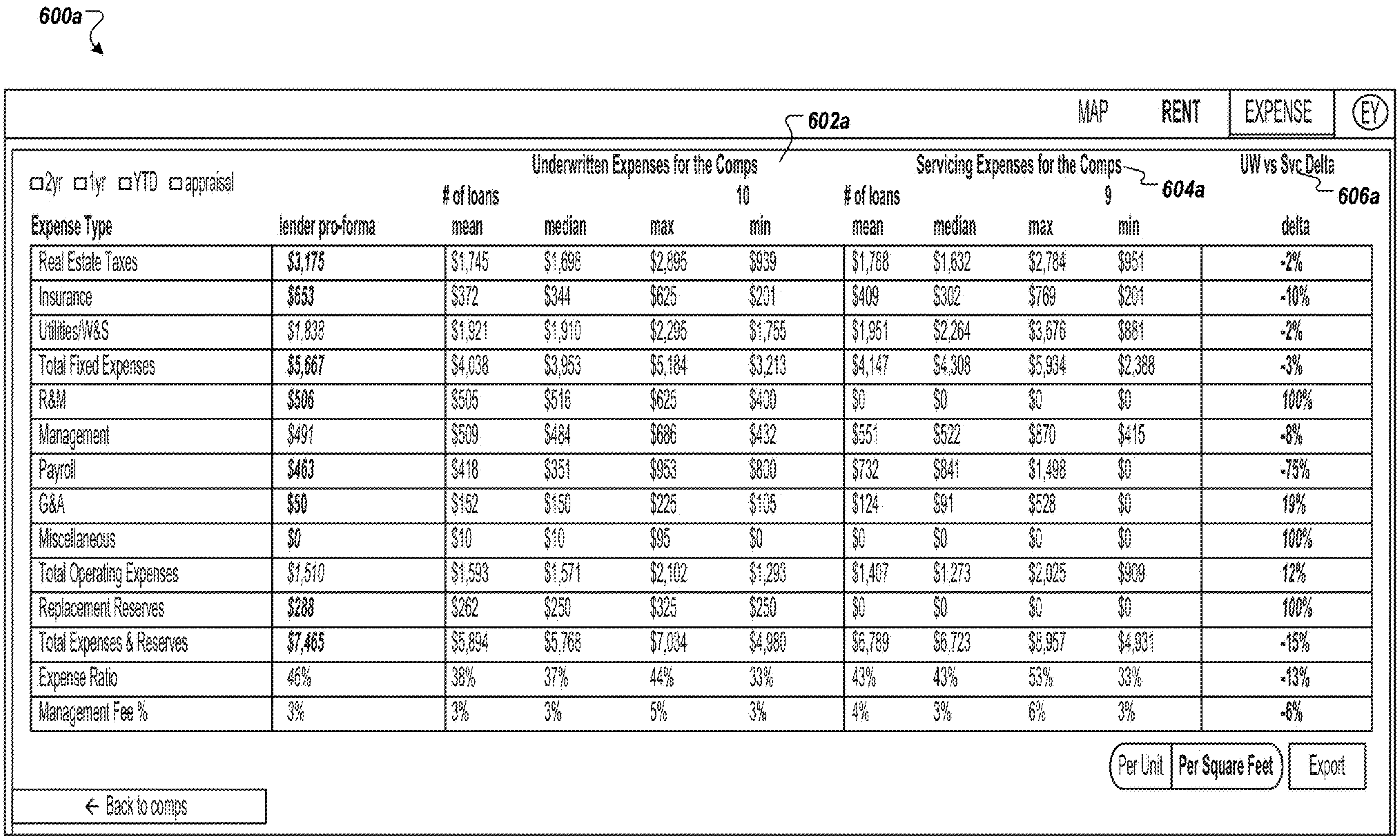

FIG. 6A

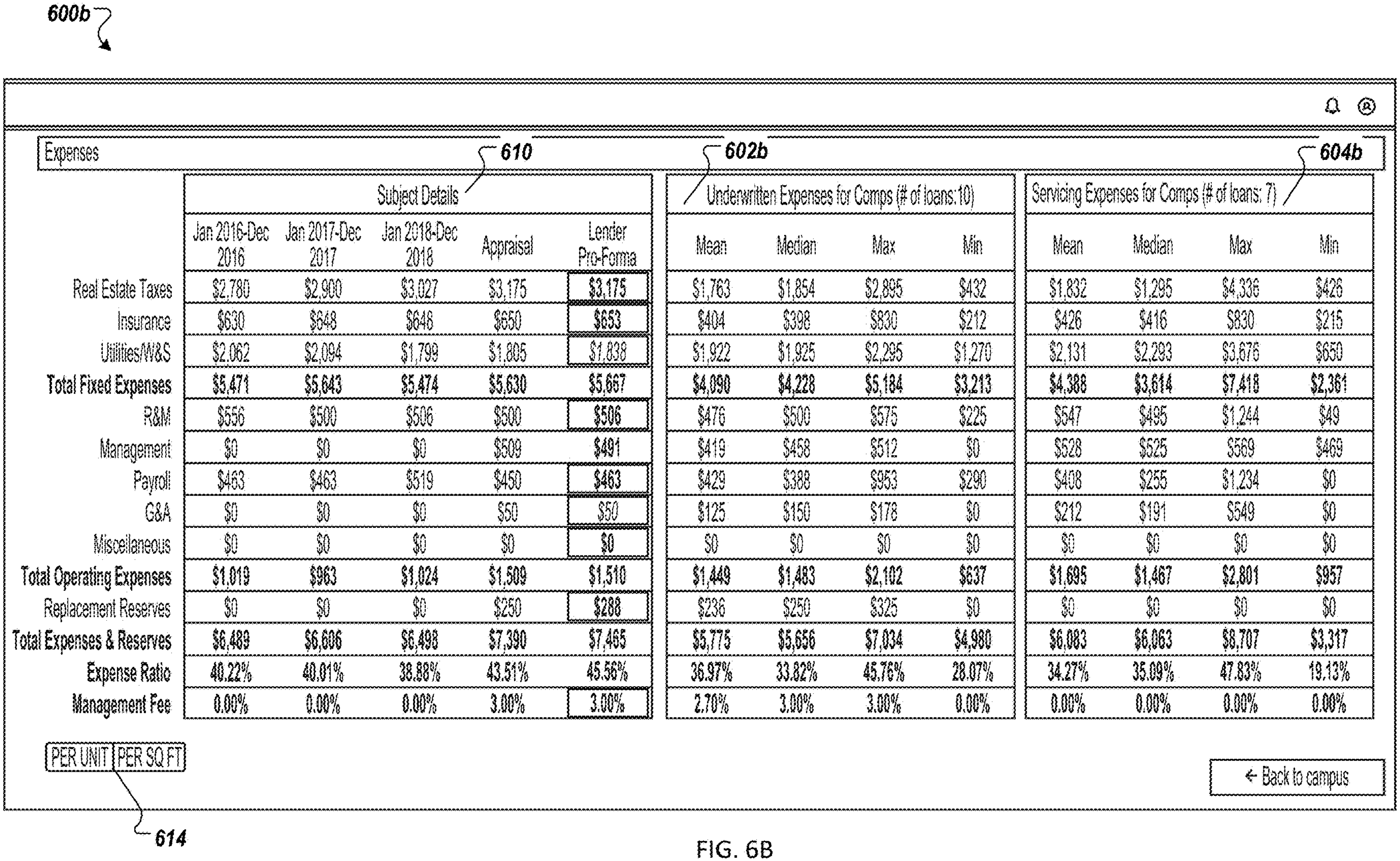

| | Subject Details | | | | | Underwritten Expenses for Comps (# of loans:10) | | | | Servicing Expenses for Comps (# of loans: 7) | | | |
|---|---|---|---|---|---|---|---|---|---|---|---|---|---|
| | Jan 2016-Dec 2016 | Jan 2017-Dec 2017 | Jan 2018-Dec 2018 | Appraisal | Lender Pro-Forma | Mean | Median | Max | Min | Mean | Median | Max | Min |
| Real Estate Taxes | $2,780 | $2,900 | $3,027 | $3,175 | $3,175 | $1,763 | $1,854 | $2,895 | $432 | $1,832 | $1,295 | $4,336 | $426 |
| Insurance | $630 | $648 | $646 | $650 | $653 | $404 | $398 | $830 | $212 | $426 | $416 | $830 | $215 |
| Utilities/W&S | $2,062 | $2,094 | $1,799 | $1,805 | $1,838 | $1,922 | $1,925 | $2,295 | $1,270 | $2,131 | $2,293 | $3,676 | $650 |
| **Total Fixed Expenses** | **$5,471** | **$5,643** | **$5,474** | **$5,630** | **$5,667** | **$4,090** | **$4,228** | **$5,184** | **$3,213** | **$4,388** | **$3,614** | **$7,418** | **$2,361** |
| R&M | $556 | $500 | $506 | $500 | $506 | $476 | $500 | $575 | $225 | $547 | $495 | $1,244 | $49 |
| Management | $0 | $0 | $0 | $509 | $491 | $419 | $458 | $512 | $0 | $528 | $525 | $569 | $469 |
| Payroll | $463 | $463 | $519 | $450 | $463 | $429 | $388 | $953 | $290 | $408 | $255 | $1,234 | $0 |
| G&A | $0 | $0 | $0 | $50 | $50 | $125 | $150 | $178 | $0 | $212 | $191 | $549 | $0 |
| Miscellaneous | $0 | $0 | $0 | $0 | $0 | $0 | $0 | $0 | $0 | $0 | $0 | $0 | $0 |
| **Total Operating Expenses** | **$1,019** | **$963** | **$1,024** | **$1,509** | **$1,510** | **$1,449** | **$1,483** | **$2,102** | **$637** | **$1,695** | **$1,467** | **$2,801** | **$957** |
| Replacement Reserves | $0 | $0 | $0 | $250 | $288 | $236 | $250 | $325 | $0 | $0 | $0 | $0 | $0 |
| **Total Expenses & Reserves** | **$6,489** | **$6,606** | **$6,498** | **$7,390** | **$7,465** | **$5,775** | **$5,656** | **$7,034** | **$4,980** | **$6,083** | **$6,063** | **$8,707** | **$3,317** |
| **Expense Ratio** | **40.22%** | **40.01%** | **38.88%** | **43.51%** | **45.56%** | **36.97%** | **33.82%** | **45.76%** | **28.07%** | **34.27%** | **35.09%** | **47.83%** | **19.13%** |
| **Management Fee** | **0.00%** | **0.00%** | **0.00%** | **3.00%** | **3.00%** | **2.70%** | **3.00%** | **3.00%** | **0.00%** | **0.00%** | **0.00%** | **0.00%** | **0.00%** |

Start

Receive Data Sets — *1102*

Features Missing > Threshold Rate? — *1104*

Yes → Drop Features — *1106*

No

Drop Features — *1110* ← Features Variation < Threshold Rate? — *1108*

Yes

No

Calculate Feature Correlations — *1112*

Select Correlated Features for Processing — *1114*

Apply Filter Criteria to Selected Features — *1116*

Apply Features to Machine Learning Process — *1118*

Any Features to Drop? — *1120*

Yes → Drop Features — *1122*

No

Output Final Features and Weights — *1124*

End

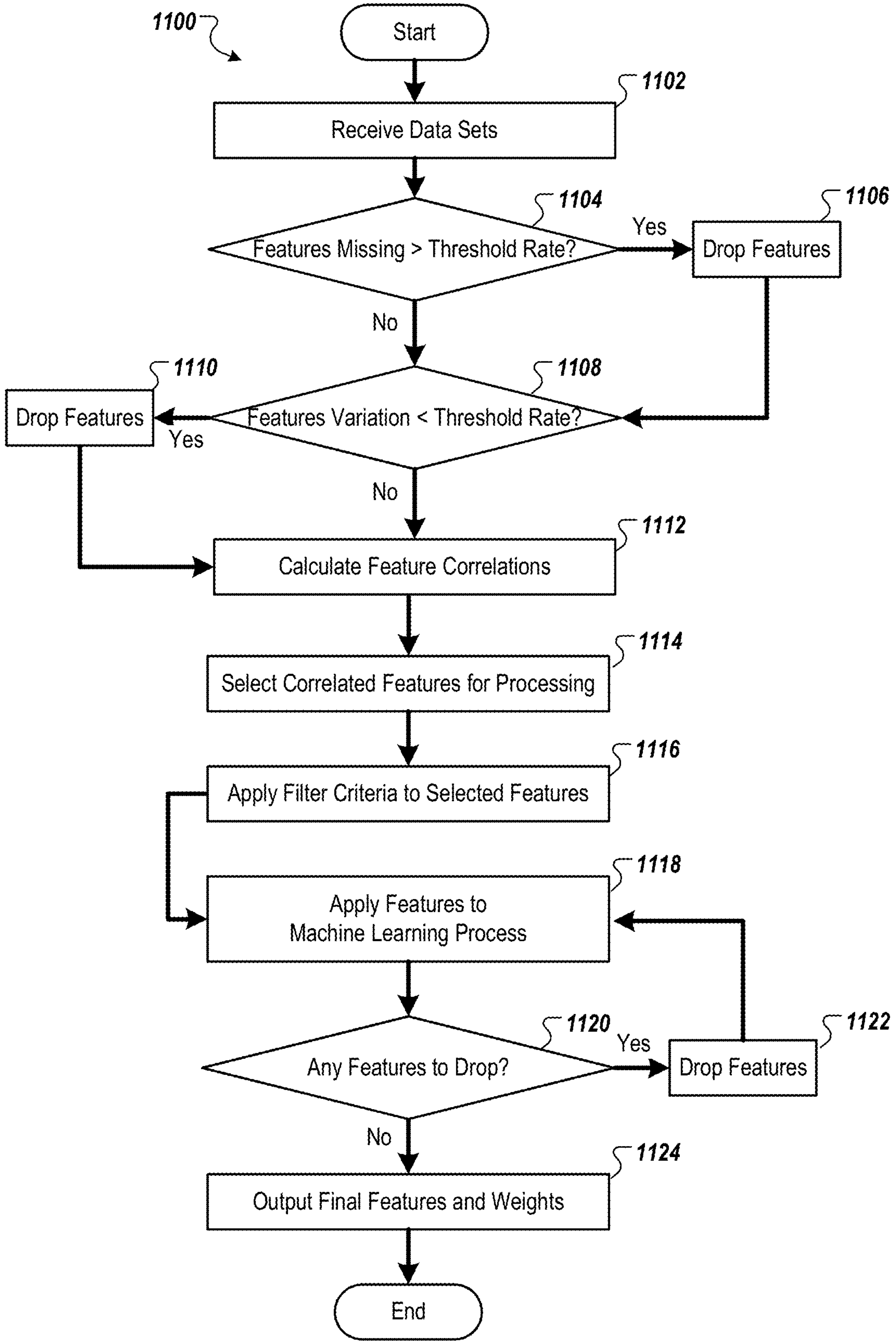

| NYC Rent Model | |
|---|---|
| Feature | Weight |
| general_higher_edu_category | 0.086 |
| population_percentage_20_34_category | 0.088 |
| lfp_20_29_category | 0.047 |
| googlestarbucks_count_category | 0.079 |
| unit_no_category | 0.056 |
| repairs_amt_per_unit_category | 0.047 |
| over_condition_sim | 0.132 |
| new_combined_3_gap6 | 0.044 |
| renovation_combined | 0.103 |
| total_repairs_count_per_unit_category | 0.042 |
| violations_no_combined_sim | 0.021 |
| Bed_Bath | 0.048 |
| sqft_avg_category | 0.110 |

1504

1502

| NYC Expense Model | |
|---|---|
| Feature | Weight |
| over_condition_sim | 0.132 |
| total_sqft_per_unit_category | 0.115 |
| renovation_combined | 0.167 |
| unit_no_category | 0.160 |
| commercial_total_ratio_category_gap5 | 0.129 |
| repairs_amt_per_unit_category | 0.103 |
| new_combined_4_gap2 | 0.082 |
| total_repairs_count_per_unit_category | 0.065 |
| elevator_flag | 0.048 |

| SW Rent Model | |
|---|---|
| Feature | Weight |
| general_higher_edu_category | 0.070 |
| googlestarbucks_count_10_50_category | 0.075 |
| googlestarbucks_count_3_category | 0.039 |
| lfp_20_29_category | 0.038 |
| googlestarbucks_count_3_10_category | 0.040 |
| population_percentage_20_34_category | 0.048 |
| googlefood_price_10_category | 0.051 |
| population_density_category | 0.031 |
| unit_no_category | 0.079 |
| parking_spaces_per_unit_category | 0.031 |
| repairs_amt_per_unit_category | 0.031 |
| renovation_combined (1604) | 0.065 |
| over_condition_sim | 0.093 |
| garden_style_dummy | 0.023 |
| swimming_pools_category | 0.020 |
| carport_spaces_category | 0.014 |
| laundry | 0.013 |
| other_recreational_facilities | 0.010 |
| clubhouses | 0.007 |
| stab_loks_yn | 0.008 |
| util_electric_paidby_rent | 0.025 |
| util_water_sewer_paidby_rent | 0.023 |
| util_heat_paidby_rent | 0.015 |
| Bed_Bath | 0.010 |
| sqft_avg_category | 0.081 |

1602

| SW Expense Model | |
|---|---|
| Feature | Weight |
| unit_no_category | 0.135 |
| total_sqft_per_unit_category | 0.129 |
| over_condition_sim | 0.148 |
| repairs_amt_per_unit_category | 0.067 |
| garden_style_dummy | 0.048 |
| parking_spaces_per_unit_category | 0.054 |
| other_recreational_facilities | 0.039 |
| carport_spaces_category | 0.036 |
| laundry | 0.024 |
| swimming_pools_category (1606) | 0.038 |
| clubhouses (1608) | 0.025 |
| renovation_combined | 0.137 |
| util_water_sewer_paidby_rent | 0.063 |
| util_heat_paidby_rent | 0.025 |
| util_electric_paidby_rent | 0.019 |
| elevator_flag | 0.012 |

FIG. 16

SYSTEMS AND METHODS OF GENERATING AND TRANSFORMING DATA SETS FOR ENTITY COMPARISON

RELATED APPLICATIONS

This application is a continuation of and claims priority to U.S. patent application Ser. No. 17/085,486 entitled "Systems and Methods of Generating and Transforming Data Sets for Entity Comparison" and filed Oct. 30, 2020, which claims priority to U.S. Provisional Patent Application Ser. No. 62/928,990, entitled "Systems and Methods for Identifying Comparable Properties Using Customized Feature Sets," filed Oct. 31, 2019. The above identified applications are each hereby incorporated by reference in its entirety.

SUMMARY OF ILLUSTRATIVE EMBODIMENTS

The present disclosure is directed to a proprietary cloud-based application referred to as a comparable property that enables users to compare multifamily rental apartment buildings in a way and form not otherwise currently possible or available. The main components include a similarity score model/algorithm that measures the differences between properties and recommends comparable properties to any given target property; and a user interface to display the similarity score model/algorithm results.

In an illustrative embodiment, a property comparison system is configured to generate, from attribute data received from one or more data sources for a plurality of properties at one or more geographic locations, feature sets for each of the plurality of properties, wherein generating the feature sets includes deriving one or more features in a portion of the feature sets from amplifying information associated with the respective property. The system can transform, via application of one or more transformation rules, one or more attributes of the feature sets for the plurality of properties into transformed property attributes to generate a transformed feature set for each of the feature sets. One or more features of the transformed feature sets for performing property similarity calculations can be identified based on application of the transformed feature sets to a trained machine learning algorithm. Identifying the one or more features can include determining a weighting value for each of the one or more features indicating a relative importance of the respective feature to determining property similarity. The system can calculate, from the identified one or more features of the transformed feature sets in response to receiving a comparable property query from an external device of a user via a network, similarity score model identifying an amount of correspondence between the plurality of properties and a property identified in the comparable property query. Comparable property recommendations can be displayed on the user interfaces of an external device based on the similarity scores for a portion of the plurality of properties having a highest similarity score associated with the queried property.

The application (or "app") is powered by the property comparison model (i.e., similarity score model/algorithm) that utilizes property level, neighborhood level and other non-traditional variables to calculate similarity scores between a given subject property and other properties within a set radius. Edward L. Glaeser, Hyunjin Kim, Michael Luca, Harvard Business School, *Nowcasting Gentrification: Using Yelp Data to Quantify Neighborhood Change*, working paper 18-077 provides empirical support for the idea of using "number of Starbucks [or other coffee shops] around a certain radius" as a proxy to gentrification, and is incorporated herein by reference. The similarity scores are utilized to highlight for users the best potential comparable properties (also referred to as comparables or comps) for the subject so they can be used as benchmarks for subject's performance assessment such as rents, expenses or sales prices.

In some implementations, the app also offers various functionality and user interfaces that allows for easy review of key real estate performance factors. In addition, the app highlights outliers within the subject's performance metrics as compared to the comps and provides recommendation for users on the potential course of action as applicable to their specific analysis. In some implementations, the app offers two specific applications for similarity score driven comparison—Rental Comps Analysis and Expense Comps Analysis. There are multiple models that cover these respective applications. In one example, for Rental Comps Analysis, the similarity score algorithm can have seven segmented models to cover major metropolitan areas nationwide. For Expense Comps Analysis, in some examples, the similarity score algorithm can have six segmented models to cover nationwide.

The implementations described in the present disclosure address a number of problems and unfulfilled needs in the commercial real estate industry. Conventional methods require massive human labor in manually searching information and potential properties. Manual searches lead to inconsistent comp selection results due to heterogeneous human experience, skills, and judgment. When real estate market participants do not have a full, unbiased view of the market, they suffer exposure to risk, and thus loss, due to poor property performance. The inventors have recognized that there is no existing tool to measure the difference between two commercial real estate properties considering both physical property conditions and location conditions. Further, there have been no tools that provide fully automated, real time assessments of real estate comparisons.

The systems and methods described herein provide a number of advantages over conventional methods. Other property performance assessment apps on the market usually rely on simple filtering to identify a set of comparable properties for any given property. Most of the time, these filters are limited to basic location characteristics and building features. Conventional methods also offer limited functionality in terms of comparing the subject's performance against the benchmarks. In the present disclosure, similarity score driven comparison and guided decision making are the features that make the Comp Engine unique. In addition, the similarity score algorithm includes a user feedback method that collects users' decisions and this data is used for model improvement.

Further, existing practice in identifying comparable properties relies heavily on human judgment and evaluation based on limited information compiled manually. The systems and methods described herein improve on the existing practice in the following ways:

- Speed—implemented as a computer-based algorithm, the systems and methods described herein execute property comparisons in an automated fashion, which is faster than the human brain.
- Quality—being grounded in the analysis and processing of large amounts of data beyond which the human brain can handle, the systems and methods described herein can take into consideration a more comprehensive set of criteria when making comparisons.

Consistency—being a mechanical process, the systems and methods of the present disclosure can make quantifiable comparisons that are not subject to the heterogeneity of different human opinions and styles of thinking.

The present disclosure provides a number of technical advantages. For example, the implementations described herein combine physical property conditions and location conditions to measure the difference between two commercial real estate properties. Additionally, the implementations described herein use advanced analytical algorithms to model the cognitive behavior and reasoning performed by real estate professionals when they compare properties. This introduces objectivity and transparency to the comparable selection process, which results in consistent and high-quality results.

The present disclosure also provides a number of economic advantages. For example, the systems and methods described herein provide significantly faster property comparison, reduced human labor cost per comparison made, better customer engagement (attract more customers; monetize use of the system), provide higher quality and more consistent property comparison results, and reduce risk and thus reduce loss resulting from inadequate property analysis.

In addition to being used for evaluating comparable properties, the systems and methods can be used for other types of real estate applications such as sales comps analysis, post-origination analysis, benchmarking property performance, and identifying clusters of properties for other properties (e.g., commercial and residential tenants looking to rent—as opposed to invest or lend—in a commercial real estate building could use the invention to identify buildings similar to ones they are already browsing).

The foregoing general description of the illustrative implementations and the following detailed description thereof are merely exemplary aspects of the teachings of this disclosure and are not restrictive.

BRIEF DESCRIPTION OF THE DRAWINGS

The accompanying drawings, which are incorporated in and constitute a part of the specification, illustrate one or more embodiments and, together with the description, explain these embodiments. The accompanying drawings have not necessarily been drawn to scale. Any values dimensions illustrated in the accompanying graphs and figures are for illustration purposes only and may or may not represent actual or preferred values or dimensions. Where applicable, some or all features may not be illustrated to assist in the description of underlying features. In the drawings:

FIGS. 5A and 5B illustrate example expense comp analysis user interface screens;

FIGS. 6A and 6B illustrate example expense results user interface screens;

FIG. 11 is a flow chart of an example method of selecting features for similarity score analysis;

FIG. 15 and FIG. 16 illustrate feature and weighting tables for comparable property analysis.

DETAILED DESCRIPTION OF ILLUSTRATIVE EMBODIMENTS

The description set forth below in connection with the appended drawings is intended to be a description of various, illustrative embodiments of the disclosed subject matter. Specific features and functionalities are described in connection with each illustrative embodiment; however, it will be apparent to those skilled in the art that the disclosed embodiments may be practiced without each of those specific features and functionalities.

Aspects of the present disclosure are directed to computing systems and methods for improving the efficiency of the underwriting process for properties such as multi-family properties (e.g., apartment/condo buildings and/or communities). In some implementations, the computing systems can include a comparable property engine that is configured to generate property comparisons based on rent (income) and expenses. In some embodiments, the computing systems ingest large data sets from numerous internal and external data sources, categorize and transform the data sets into customized data sets that are applied to trained machine learning data models to determine similarity scores that indicate how similar one or more properties are to a particular property. In some examples, similarity scores can be calculated for both rent and expenses, which can greatly improve the efficiency and accuracy of identifying comparable properties. Additionally, the system can execute a user feedback process to solicit feedback on results from users, which can be used to refine performance of the machine learning algorithms and resulting similarity score determinations. Therefore, the systems and methods described herein provide a technical solution to a technical problem above what can be achieved by loan underwriters who have their own personal biases, limited information, and are unable to determine key features and weighting factors with the precision and accuracy achievable by the machine learning data models that are trained and used by the system.

As economic growth slows and becomes uncertain, people become less able to enter the real estate market as home buyers. Also, housing shortages further inhibit them from entering the real estate market. As a result, multifamily buildings help mitigate the effects of these problems, and many continue to see renting as a more affordable option than home purchase. The systems and methods described herein apply advanced analytic techniques to the multifamily real estate market by providing a comparable property engine that suggests rent and expense comps for a given subject property, calculates multifamily property similarity scores, and reduces underwriters' comp analysis time by over 60%.

Figure 1:
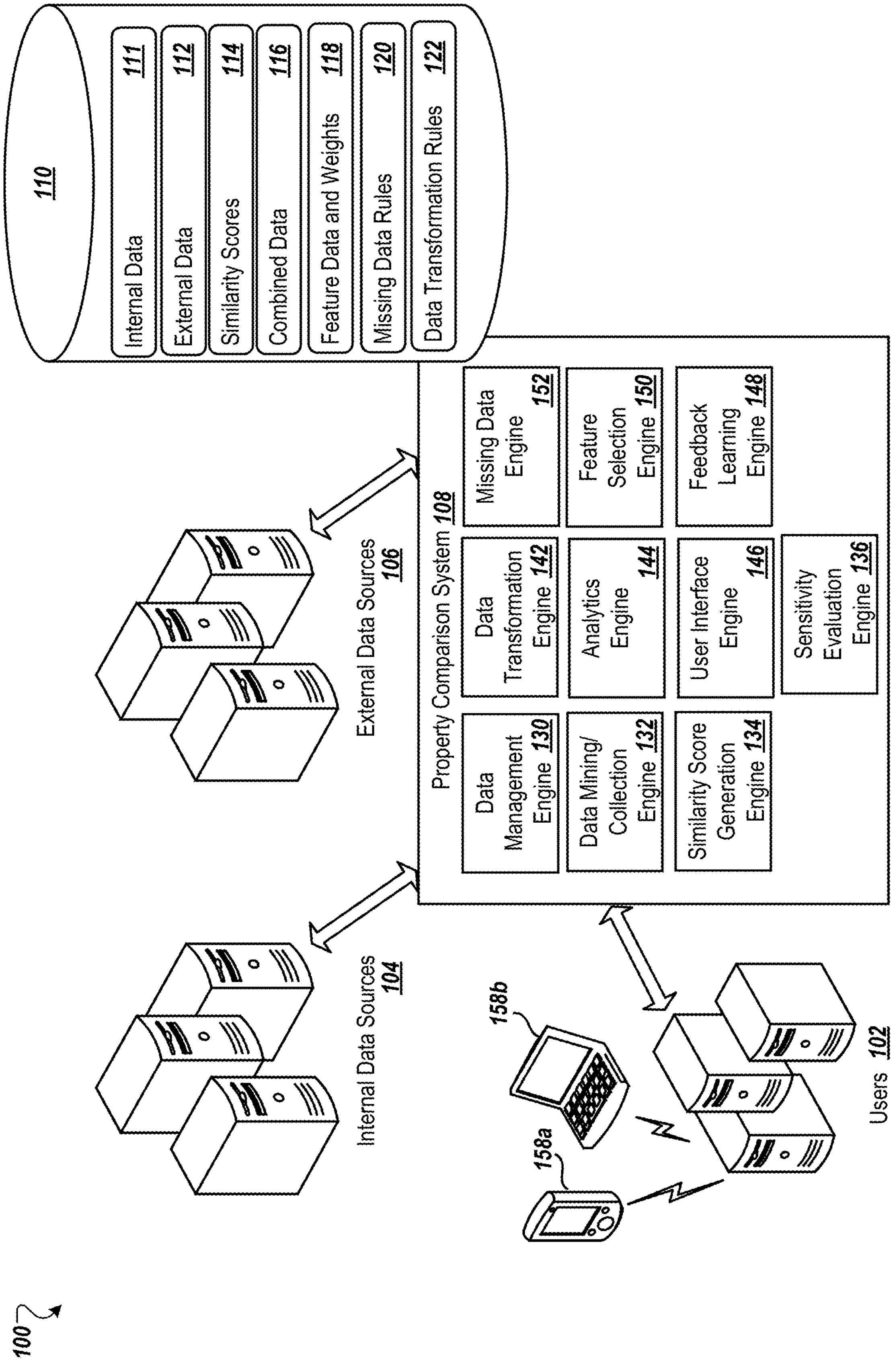
FIG. 1 is a block diagram of an example environment for a property comparison system.

FIG. 1 is a block diagram of an example environment 100 for a property comparison system 108. The diagram illustrates relationships, interactions, computing devices, processing modules, and storage entities used to gather, generate, organize, store, and distribute the information necessary to automatically, accurately, and efficiently generate different types of comparison statistics for multifamily rental apartment buildings in a way and form not otherwise currently possible or available. In some implementations, the comparison statistics can be derived from a calculated similarity score for different properties. In some implementations, users 102 interact with the property comparison system 108 via an application hosted on an external device 158, such as a laptop 158*b*, mobile device 158*a*, or tablet. Users can include loan purchasers, providers, underwriters, and/or prospective property purchasers.

The system 108 (similarity score model/algorithm) is configured to rapidly ingest data from multiple internal data sources 104 and external data sources 106 by data mining and collection engine 132, identify statistically significant driving variables and transformations by a feature selection engine 150 and data transformation engine 142, and train and fine tune a machine learning algorithm by an analytics engine 144 to identify a set of final variables for analysis. In some implementations, the property comparison system 108 can be configured to communicate with internal data sources 104 and external data sources 106 via a network (e.g., network 828 in FIG. 8). The system 108, via a similarity score generation engine 134, is further configured to, using the trained algorithm and final variables, to calculate property similarity scores that allow users to more quickly and accurately identify comparable multifamily properties.

The inventors have recognized that small balance loans (SBLs) for buildings are often hard to benchmark and have conventionally required labor-intensive underwriting to appropriately capture property and submarket features. Using a unique and customized process that links SBL property data (e.g., property attributes, cash flows, etc.) with external hyper-local geospatial data received from external data sources. To solve these problems, from the linked data, the system 108 can calculate building similarity scores to account for property idiosyncrasies and validate rents for the target property by comparing it with market data. The system 108 also allows comparable property data to be mapped and visualized within a geospatial environment. In some examples, a feature selection engine 150 and data transformation engine 142 combine all ingested data in a customized way to create a single data source (e.g., combined data 116 in data repository). In some examples, analytics engine 144, using machine learning algorithms, identifies one or more of the most impactful attributes for predicting rent with high accuracy. In one example, the analytics engine 144 can identify over thirty attributes for predicting each of rent and expenses for properties with high accuracy. These attributes can include both geospatial features, traditional features (e.g., year built, number of units, total residential square footage, etc.), as well as non-traditional features (e.g., number of grocery stores within a predetermined radius, bus stops within half a mile, etc.) The analytics engine 144 can be further configured to identify comparable properties. Other variables that can be ingested and identified by the analytics engine 144 as identification features can include non-traditional features such as coffee shops or restaurants within the vicinity of a property and building violations. In some examples, various types of points-of-interest or other contributing factors (e.g., restaurants, beach resorts, and college, retail, entertainment, crime occurrence locations, transportation access point locations (e.g., bus stops) within the vicinity) can be identified based on proximity and density with respect to a given property. These functions of the analytics engine 144 can decrease or remove human error in selecting comparable properties and aggregating data. A user interface engine 146 can provide a customized user experience for selecting and evaluating the best comparables for a subject property. Therefore, the property comparison system 108 provides both improved quantity and quality of comparables.

Also, the system 108 is designed to seamlessly scale to include or exclude various markets and locations from its analysis. Further, the platform of the system 108 provides numerous advantages that include expedited comparable analysis and display, elimination of manual data pulls, standardized rental and comp analyses, expanded internal data pool, processes to supplement missing data, and easy, searchable access to data on comparables from past funded deals in a structured format.

In some implementations, data repository 110 can store internal and external data 111, 112 received from internal data sources 104 and external data sources 106, respectively, and used by the system 108 (e.g., analytics engine 144) in generating machine learning data models. The internal and external data 111, 112 can be used to both train the machine learning data models and/or to characterize properties in one or more geographic locations. In some examples, internal data 111 comes from a multifamily underwriting platform (OUS) and an asset management platform for multifamily loans (SMART). In some embodiments, OUS is a primary underwriting platform for multifamily loans, which can provide data elements used by the machine learning data models concerning physical attributes of the subject property such as number of units, unit mix, renovation year, square footage, and amenities. In some examples, these variables capture the size and condition of the property. In addition, OUS can also provide a rent dollar amount for the subject property that can be used as a target variable for trained XGBoost models. In some implementations, SMART is a primary asset management platform for multifamily loans that houses ongoing property and financial data post-underwriting and can be used to augment missing or outdated underwriting data. In some embodiments, data can be captured from OURS and/or SMART at the loan level, which can correspond to a property level. In some cases where multiple loans can represent the same property due to refinances, each loan record can represent the property at the time of the loan and can be controlled via age filtering or deduplication. In some implementations, data mining/collection engine 132 may refresh internal data 111 daily via scheduled batch job. Both the eligible population and variable values are updated to reflect real-world changes that occurred during the previous day. In other examples, internal data 111 may be updated automatically as internal data source information is updated. In some examples, the internal data 111 can also include loan appraisal data that includes photos of properties.

In some embodiments, external data sources 106 that provide external data 112 can include a wide variety of sources such as census data, tax (IRS) data, Google places, third-party multifamily data vendors, and other open data sources. Table 1 below shows examples of types of data sources (e.g., external data sources 106) that provide external data 112 to the system 108. Table 1 also provides details regarding the granularity of each of the types of external data 112 and the frequency of data updates. In some implementations, data obtained from external data sources 106 can be used as non-traditional features that enhance the accuracy of the comparables analysis when compared to systems that just use traditional data features in their comparables analysis. In some embodiments, the external data 112 can be used to characterize the neighborhood or surrounding area of a given subject property in ways that internal data may not be able to provide and to augment physical property information that may not be available from internal data systems. In some examples, different types of data from different data sources can be used in certain segment machine learning data models (e.g. rent versus expense, different geographic regions). In one example, certain data sources (e.g., NYC Open and Pluto) data may only be available for properties in certain locations (e.g., New York City properties). In addition, certain types of data may be used for data modeling and others may be used in user interface generation. Data mining/collection engine 132, in some examples, can extract external data 112 from each of the data sources at an update frequency (e.g., the update frequency listed in TABLE 1). In other examples, one or more of the external data sources 106 can be configured to automatically provide requested data to the system 108 at the predetermined frequency. The external data sources 106 and types of external data 112 described herein are exemplary and are not meant to include an exclusive or exhaustive list of types of external data sources 106 that can provide data to the property comparison system 108.

TABLE 1

| Data Source | Description | Information Used In Modeling and/or User Interface | Granularity Level | Update Frequency |
|---|---|---|---|---|
| Census | Demographic data provided by the American Community Survey | Population; Income; Education level; Labor force participation | Census Tract | Annually |
| Google Places | Points of interest by Lat/Long | Number of nearby Starbucks stores (or other points of interest) | Exact Lat/Long | Bi-annually |
| Third-party Multifamily Data Sources on Properties | Physical property information | Number of units; Number of floors; Renovation year; Property size; Year built | Address | Bi-annually |
| Other Open Data Sources | Specific to multifamily properties and local information services | Local neighborhood and property features | Local Neighbor-hood | Annually |

In some embodiments, the property comparison system 108 can include one or more ID-1T processing engines or modules 130, 132, 134, 136, 142, 144, 146, 148, 150, 152 executed as software programs on hardware computing systems. References to the engines or modules throughout the disclosure are meant to refer to software processes executed by circuitry of one or more processing circuits, which can also be referred to interchangeably as processing circuitry. In some implementations, the processes associated with the property comparison system 108 can be performed by one or more servers having one or more processing circuits such that some processes or portions of processes may be performed on different servers. The processes executed by the processing engines can include identifying the key features for comparable properties from internal and external data sources based on both underwriting expertise and data analytics generated by trained machine learning data models, calculating the degree of similarity between properties, and generating comparable property recommendations based on the calculated similarity scores for both rent and expense comparables. This similarity score generation performed by similarity score generation engine 134 is based on the principle that properties with similar attributes and similar neighborhood will be positioned similarly (for operating rent and expense) in the related market. In some implementations, analytics engine 144 uses machine learning algorithms to identify the modeling features in the property comparable analysis as well as the weighting factors (e.g., feature data and weights 118) associated with each of the identified features. In some examples, the system 108 uses an Extreme Gradient Boosting (XGBoost) algorithm that sequentially corrects errors of previous models or a Random Forecast algorithm that uses a bagging technique of grouping weaker models to form more powerful models. Techniques for applying XGBoost modeling algorithms work are described in Tianqi Chen, Carlos Guestrin, XGBoost: A Scalable Tree Boosting System, A C M, 2016, which and is incorporated herein by reference.

In one example, the property comparison system 108 includes a data management engine 130 that organizes the data received by the system 108 from the users 102, internal data sources 104, and external data sources 106 and controls data handling during execution of the processes described further herein. The data management engine 130, in some embodiments, also controls the interaction of the property comparison system 108 with at least one data repository 110 associated with the environment 100. For example, the data management engine 130 controls the storing and accessing of both system-generated data and system-received data as well as the interactions between system-generated and system-received data. For example, the data management engine 130 accesses internal data 111 and external data 112 from data repository 110 and provides the internal and external data 111, 112 to missing data engine 152, feature selection engine 150, and/or analytics engine 144. Further, the data management engine 130 receives feature data and weights 118 from analytics engine 144 and feature selection engine 150, which it stores in the data repository 110. In some embodiments, the data management engine 130 controls the flow of data between the data repository 110 and the property comparison system 108.

In some embodiments, the property comparison system 108 includes a feature selection engine 150 that applies data processing techniques to generate customized data structures for applying to machine learning data models that generate outputs used to calculate similarity scores. These data processing techniques employed by feature selection engine 150 and data transformation engine 142 can also include improving on original data through a process of filling in missing features. Additionally, feature selection engine 150 can perform data transformation processes that allow the system 108 to capture relationships between property features and property quality. In some examples, types of data transformations include creation of new features from features in original data sources, changing continuous features into categorical features, and re-bucketing of categorical features.

In some implementations, feature selection engine 150 selects features to be used for feature analysis and machine learning by performing one or more feature selection and population filtering processes. For example, the feature selection engine 150 can examine the missing rate for each possible data feature and drop any features that are missing from data sets (including both internal data 111 and external data 112) and drop any features with an absence rate of greater than a predetermined percentage (e.g., 50%). Additionally, features with less than a predetermined percentage of variation (e.g., 10%) may also be dropped from the feature sets. In some implementations, the feature selection engine 150 can run a correlation analysis to group highly correlated features into the same categorical division or bucket. In one example, the correlation analysis is a Pearson analysis. In some examples, a portion of the features in each bucket can be identified for use by the system 108. In some implementations, a feature for each bucket that has a highest correlation with an outcome variable (e.g., rent or expense) is selected as the feature for a respective bucket. In some implementations, the bucketed data population is filtered to remove data entries that have missing values for many property features. In one example, only properties with certain core property attributes (e.g., unit size and number of units) are retained for analysis. Additionally, any property information associate with loans that are dead deals or have not yet passed the transfer to purchase phase of origination are removed from the data population.

In some implementations, analytics engine 144 runs a machine learning process on the filtered data population features to further identify features used for similarity score calculations. In some examples, the feature data sets are used to train machine learning data models, which determines the features and weights that are the most predictive of comparable properties. In some examples, the features having the lowest weighting values are dropped from the analysis (e.g., the features having weights that are less than a predetermined threshold or features that fall within a lowest percentage of weights). In other examples, the identified features and weights are presented to a user (e.g., an underwriter or other subject matter expert) who flags one or more features for removing from the analysis. In some examples, feature selection can be an iterative process that continues until all features have importance weights that are greater than a predetermined threshold or fall within a predetermined range.

In addition, multiple machine learning models can be trained and used to generate rent and expense feature/weighting sets for multiple geographic regions, and the identified features and weighting values may vary by geographic region. For example, FIG. 15 shows tables 1500, 1502 of identified rent and expense model features with corresponding weights for New York City (NYC), and FIG. 16 shows tables 1600, 1602 of identified rent and expense model features with corresponding weights for the Southwestern (SW) region of the United States. In one example, both rent feature tables 1500, 1600 include a combined renovation feature 1504, 1604, which refers to a number of renovations that have been performed on the property over a predetermined period of time. However, the relative weighting values for the combined renovation feature 1504, 1604 are different (for example, for feature 1504 for the NYC model, the weighting value is 0.103, and for feature 1604 for the SW model, the weighting value is 0.065) due to the learning performed by the respective machine learning data model as it ingests data. Further, in some implementations, certain features may be included in some location models that are not included in others. For example, the SW expense model 1602 may include swimming pool 1606 and clubhouse features 1608 while the NYC expense model 1502 does not include those features because NYC multifamily properties may not typically include swimming pools or clubhouses while SW properties do. Having data models that are customized to specific geographic regions and that are continuously updated to include the most relevant features to determining property similarity improves score accuracy and also improves overall system processing efficiency by reducing a number of calculations that are performed in determining rent and expense similarity scores. The variables and weighting values displayed in tables 1500, 1502, 1600, 1602 are exemplary and the description herein is not meant to be limiting.

Returning to FIG. 1, in some implementations, once a set of predictive data features have been identified, then missing feature engine 152 can be configured to fill in missing data features for properties, which improves the original data set used to determine property similarity scores. In some situations, data can be missing from feature data sets due to feature entry default such as when a value such as "renovation date" defaults to "missing" if a property has not been renovated within a certain number of years. Additionally, a feature for "parking garage" may default to "missing" if the property has no parking garage. In some examples, other features may be missing due to insufficient information entry by one of the internal or external data sources. For example, a "laundry" feature and a "floor number" feature are often not included in the received sets of internal and external data 111, 112.

In some examples, missing feature engine 152 can be configured to impute missing information in one or more ways. In some examples, certain features of external data 112 can be identified that best complement particular features of internal data 111. For example, both collected property level data and Pluto (for New York City properties) include renovation date and build year. Additionally, default values can be applied for certain features when those features are missing from the data sets. For example, if "parking garage" or "elevator" features are missing, the missing feature engine 152 may apply values of "O" to those features. Additionally, missing feature engine 152 can extract textual features from unstructured text files. For example, OUS data includes a data filed for "property comments" that may include details about a laundry facility on site. In one example, the missing feature engine 152 may extract text such as "laundry room" or "in-unit laundry" to determine whether a property includes a laundry feature or not. Additionally, the missing feature engine 152 can impute missing data from another available feature based on a correlation between the features. For example, a building floor number can be inferred from a first value of a unit number. In some embodiments, missing feature engine 152 can also include one or more image processing sub-engines that can be configured to detect and impute missing features from image files from one or more internal data sources 111 such as photos in appraisal files. For example, the image processing sub-engine may be configured to detect the presence of certain missing features by detecting those features within appraisal photos (e.g., laundry room features such as washers, dryers, and deep sinks). The image processing sub-engine may also be able to detect changes in property images that may be indicative of property degradation or renovations, which can be used to determine renovation year of a property. In some implementations, rules for imputing missing data can be stored in data repository as missing data rules 120.

In some embodiments, data transformation engine 142 produces data structures that capture relationships between observed property features and property quality to most accurately measure similarity between properties by transforming raw data received from internal and external data sources 111, 112 into meaningful features. In some examples, new features are created from raw data values received from data sources. In some aspects, transformed features may be normalized values for raw data values. For example, instead of using unit rent as an outcome variable, the system 108 calculates "rent per square foot (sqft)" because it better reveals the property quality. In another example, instead of using a dummy variable for each of the amenities, the data transformation engine 142 can combine amenity features together to calculate the total number of amenities for a property. Other examples include, but are not limited to, calculating renovation amount per unit in place of total building renovation amount, calculating the ratio of commercial area to residential area in place of including both commercial and residential areas, and, for each neighborhood, calculating population density, instead of using total population.

In some implementations, data transformation engine 142 can also change continuous value features into categorical features, which improves overall processing efficiency and accuracy. For example, for almost all continuous features, a relationship between a given feature value and property quality is not continuous. For example, because renovation approaches, trends, and styles change and age, a property renovated within 2 years may not be considered different from another property renovated within 3 years. However, a property renovated within 5 years may be considered with better quality than another property renovated 6 years ago. Thus, a categorical feature "renovated_date_category" may be created, which has a value of 0 if a property is renovated within 5 years; has a value of 1 if a property is renovated 6-10 years ago; has a value of 2 if a property is renovated 11-20 years ago; and has a value of 3 if a property is renovated more than 20 years ago. In another example, unit square footage can be categorized based on a range of square foot values (e.g., 500-750 sqft, 751-1000 sqft, 1000-1250 sqft, etc.). In some examples, rules for transforming continuous value features into categorical features can be stored in data repository 110 as data transformation rules 122.

In some examples, data transformation engine 142 re-buckets or classifies categorical features to categorical buckets or divisions. In some implementations, some property features may be assigned to the wrong buckets based on raw data values, which can result in biased importance weights for these features. To correct the importance weights of these features, the data transformation engine 142 re-bucket the categorical into more appropriate categories. For example, for raw data, a feature for "property overall quality" may have 9 categories: 1 (poor); 2 (Fair); 3 (Average); 4 (Good); 5 (Excellent); 6 (Excellent); 7 (Above Average); 8 (Average); 9 (Below Average); 10 (Inferior). In some examples, some of these categories may have very few data observations assigned to each bucket, and some categories may represent substantially similar property quality. Applying the original overall quality data from the raw data to the machine learning process may generate a very small weight due to these data bucketing issues even though property quality may be very important to determining comparable property similarity. To boost the weight of this feature to a level that accurately represents the importance of the property quality feature, this feature may be bucketed into three categories: "Above Average" if the original value is 4, 5, 6, or 7; "Average" if the original value is 2, 3, or 8; and "Below Average" if the original value is 1 or 9. This data transformation and re-classifying into buckets helps ensure that the importance weight of this feature increases and has a greater impact on the comparable analysis. In some examples, the data transformation engine 142 performs these re-bucketing procedures based on feedback received from subject matter experts from underwriters. These data transformations and classifications also account for outliers, which may be grouped into a first bucket or a last bucket for the feature.

Similarity score generate engine 134, in some examples, generates and applies an advanced analytical/scientific algorithm to model the cognitive behavior and reasoning performed by real estate professionals when they compare properties, so that the data and the variable weights can be combined in a comprehensive way to generate appropriate scores. In some implementations, the analytics engine 144 can use machine learning predictive models to make feature selection determinations and feature weighting determinations, which indicate a relative importance of each of the identified features to a similarity score calculation. In addition, different models are used for different outcome variables and regions. For example, different models can be trained and applied for rent and expense variables and for multiple geographic regions (e.g., large metro cities such as New York City or Chicago, states, or regions of the country such as Southwest, Northeast, Midwest, etc.). In some examples, the similarity score generation engine 134 may apply a Gower distance algorithm to calculate different types of similarity scores for a given property. For example, the similarity score generation engine 134 may calculate similarity scores for a property level, neighborhood level, and/or unit type level associated with the subject property.

In some examples, a machine learning algorithm is used by analytics engine 144 to identify features weights, which may indicate amounts of correlation between rent/expense levels with each data feature. The model, in some examples, is based on machine learning algorithms that can learn from data without relying on rules-based programming. Since, in some implementations, target variables (rent or expense) are in a numeric form, the machine learning model may be similar to a regression type of model, but it outperforms the typical regression model in handling nonlinearity, collinearity and unstructured data. Statistically, importance of a variable importance can be measured by calculating the increase/decrease of the model's prediction error after including/excluding that variable. The use of machine learning models increases accuracy and interpretability methods and can estimate the importance associated with each feature.

In some implementations, the machine learning models used by analytics engine 144 are XGBoost algorithms, which is an optimized distributed gradient boosting library designed to be highly efficient, flexible, and portable. Boosting can be a sequential process where each subsequent model attempts to correct the errors of the previous model. The succeeding models are dependent on the previous model. In some implementations, XGBoost models combine a number of weak learners to form a strong learner through weightings. Feature importance is calculated using the "weight" method, that is, the percentage relative to all other variables that a given variable is used to split data across all trees. This calculation can be implemented in the Python xgb package. In another example, a Random Forest model may be used instead of a XGBoost model to determine predictive features and weightings.

In some implementations, similarity score generation engine 134 generates similarity scores for both rent and expense comparables from the feature variables and weights output by the trained machine learning data models. In some examples, the similarity scores measure a difference in physical property characteristics between two properties in a particular geographic area. Using the output features and weights, neighborhood features and their weights are used to calculate a neighborhood similarity score, which measures a difference in two neighborhoods where comparable properties reside. For rent comparables, the data models and similarity scores account for unit type level characteristics and property-level conditions. This allows the system 108 to generate property-level similarity scores at unit-type level. Previously, in the industry of multifamily underwriting, rent comparables could only be compared and selected at a property level but not unit-type level. Availability of unit-level comparison enables comparisons to be performed at a more granular level to improve accuracy of the generated comparables. In some examples, for expense comparables, because expenses are measured on a property-level only and expense comparisons are much less sensitive to neighborhood conditions, expense similarity scores are calculated using property-level physical features.

In some examples, the similarity score generation engine 134 applies a Gower distance algorithm to calculate spatial distance between any pair of properties, using the selected feature and their feature importance. The Gower distance is described in J. C. Gower, *A General Coefficient of Similarity and Some of Its Properties, Biometrics*, Vol. 27, No. 4. (December 1971), pp. 857-871, the contents of which is incorporated herein by reference. Gower's distance metric can be defined as follows:

$$\frac{\sum_k s_{ijk} w_k}{\sum_k w_k},$$

where $S_{ijk}$ is the distance between property i and j on the $k^{th}$ variable; and $w_k$ is the weight/importance of the $k^{th}$ variable. The Gower distance is a weighted average of the distances on the different variables, which allows a weight $w_k$ to be assigned each individual variable, effectively changing the importance of that variable in the distance calculation.

In some implementations, Gower's distance metric is capable of handling different types of variables, such as categorical and numeric as in the case of comparable similarity score calculation. The strength of Gower's distance metric lies in the calculation of $S_{ijk}$. Unlike traditional distance metrics, $S_{ijk}$ does not apply the same formula to all variables. For categorical variables we use an equal/not equal comparison, but for numeric variables, the absolute difference can be used. To prevent one type of variable having more impact on the distance metric, all $S_{ijk}$ are scaled to the range [0, 1]. For categorical variables, this means that a value 0 to $S_{ijk}$ is assigned when the categorical variables of i and j are equal and 1 when they are not. Numeric variables can be scaled by dividing the absolute difference by the range of the variable. The similarity between property i and property j equals 1 minus the distance, and the similarity score can be expressed as follow:

$$s_{ij} = 1 - \frac{\sum_k s_{ijk} w_k}{\sum_k w_k}.$$

For expense models, only property level features may be used to calculate similarity score for two reasons since expense comparable selection primarily depends on property features other than neighborhood features and there are oftentimes satisfactory comps available within acceptable radius.

In some embodiments, when comparing MF properties for rental incomes, underwriters analyze property features and local neighborhood features relatively independently. Thus, for rent comparables, the similarity score generation engine 134 can calculate property similarity score and neighborhood similarity score separately. $s_{ij}^{N}$ is the similarity score with only neighborhood information, and $s_{ij}^{P}$ is the similarity score with only property physical features. Furthermore, given that the data contain both unit level information and property level information, similarity scores can be calculated at a unit-type level.

As an example, let k=[k1, k2] be the vector of all property related features, where k1 is the vector of unit-type level features that vary among unit-types within the same property; and k2 is the vector of property level features that stay the same across unit-types within property, but vary across properties. For example, feature "unit size" is the average unit size for each unit type, so this feature is a unit-type level feature, not a property level feature. In total, 10 different unite types may be considered based on bedroom/bathroom combinations: 0Bed1Bath, 1Bed1Bath, 1Bed2Bath, 2Bed1Bath, 2Bed2Bath, 2Bed3Bath, 3Bed1Bath, 3Bed2Bath, 3Bed3Bath, 4Bed+. For each unit type, the unit-type similarity score is calculated based on the following:

$$s_{ij}^{unit\_type} = 1 - \frac{\sum_{k1} s_{ijk1}^{unit\_type} w_{k1} + \sum_{k2} s_{ijk2} w_{k2}}{\sum_k w_k}.$$

If one unit-type is not shared by the two properties in comparison, the similarity score for this unit-type is set to 0: meaning the pair of properties are not comparable at this unit-type. Further, the 10 unit-types can be regrouped into four final unit-type categories based on number of bedrooms. For each final unit-type category, in some implementations, the similarity score is the weighted average of unit-type similarity scores within the category. The weight is measured using the number of units. For example, property i and property j share two unit-types: 1Bed1Bath and 1Bed2Bath. Then, the final 1Bedroom similarity score between i and j is calculated as:

$$s_{ij}^{1Bedroom} =$$

$$\frac{\text{Units}_{ij}^{1B1B}}{\left(\text{Units}_{ij}^{1B1B} + \text{Units}_{ij}^{2B2B}\right)} * S_{ij}^{1B1B} + \frac{\text{Units}_{ij}^{2B2B}}{\left(\text{Units}_{ij}^{1B1B} + \text{Units}_{ij}^{1B2B}\right)} * S_{ij}^{1B2B},$$

where $$\text{Units}_{ij}^{1B1B}$$

is the total unit number of 1Bed1Bath in both property i and property j. For rent comp selection, the similarity score generation engine 134 selects top comparables for each available final unit-type category separately.

With the unit-type level similarity scores, the accuracy of the existing comparable process in the industry can be improved. One common problem underwriters encounter is that they sometimes need to choose between two comps where each is a good comp for only some unit-types, not all unit-types. For example, for a subject underwriting property with both one- and two-bedroom units, comp A is a good comp for 1-bedroom units but a bad comp for 2-bedroom units; while comp B is a good comp for 2-bedroom units but a bad comp for 1-bedroom units. Under current industry-wide property level selection practice, the underwriters have three different choices: A only, B only, or A and B. However, any choice brings errors to the rent estimation for the unit-type that are not ideal. For example, if A is selected, then the rent estimation on 2-bedroom units would be biased; if B is selected, then the rent estimation on 1-bedroom units would be biased; and if both A and B are selected, the rent estimation on both 1-bedroom and 2-bedroom units would be biased. Using the methods described herein, with the unit-type similarity scores, 1-bedroom units of comp A are selected for the 1-bedroom units of the target property; and 2-bedroom units of comp B are selected for the 2-bedroom units. Thus, unit-type similarity scores utilize both comps A and B to assist users in generating accurate estimations of rents for all available unit-types. Therefore, similarity score generation engine 134 can improve accuracy and efficiency of the current property-level rent comparable selection process.

In some implementations, sensitivity evaluation engine 136 can determine a sensitivity of calculated similarity scores to determine how sensitive to potential factors that could shock weighting factors, such as hyperparameter tuning or changes in the model sample population. In one example, for both the rent and expense models, each of the variable weights can be individually increased and decreased by predetermined percentages (e.g., +/−10% and +/−20%) in relative magnitude to determine the impact on the similarity score. In some examples, similarity scores remained stable despite shifts in variable weights, indicating that the scores provide a reliable indicator of similarity in the face of shifting conditions.

In some implementations, the system 108 includes a feedback learning engine 148 which incorporates feedback learning that is used to further train and refine machine learning algorithms used by analytics engine 144 to provide more accurate results. In some examples, users 102 (e.g., underwriters, system backend administrators) provide feedback regarding the quality of system-identified comparable properties based on calculated similarity scores, and this feedback is used to refine and/or retrain the machine learning data models. In one example, the user-provided feedback can evaluate competencies such as whether any similarity score model-selected comps are useful to an underwriter or whether the system has produced enough similarity score-model selected comps.

In some embodiments, during a model testing phase, the system 108 may determine that a machine learning data model is successful when a predetermined number of recommended comps (e.g., at least 3 out of 5) are acceptable to a results reviewer. In some implementations, for each segment model (e.g., rent and expense segments), the user interface engine 146 provides comp recommendation results to the user 102 via one or more user interface (UI) screens for one or more properties based on similarity scores calculated by similarity score generation engine 134. In some examples, for each property, the user 102 indicates whether each of the recommended comps is satisfactory and provides amplifying reasons why a given comparable property is or is not satisfactory to the user 102. In some examples, for each subject property, the system 108 outputs a user review form showing a predetermined number of highest-ranking comps (in one example, 5 comps). For each comp, the form provides the similarity score the subject property and the comp and a list of one or more evaluation aspects, which can include unit size, exterior curb appeal, interior appeal (e.g., style, finishes, common areas), extent of renovations, on-site amenities, in-unit amenities, structural and/or mechanical conditions, living conditions (e.g., violations, tenant complaints), and restrictions and subsidies. For each of the listed evaluation aspects, the user 102 can provide comparable rating feedback indicating whether a respective evaluation aspect is very different, somewhat different, somewhat similar, or very similar to the subject property. Additionally, the user 102 can indicate whether a respective comp is acceptable (useful in evaluating the subject property) and what aspects of the comp are acceptable or not. In some examples, users 102 can submit separate forms for rent and expense comps.

In some examples, a given machine learning data model may be considered successful when its success rate, or the rate at which a reviewer deems one of its resulting comparable properties satisfactory, is above a predetermined threshold. In one example, the predetermined threshold is 80%. When the predetermined success threshold is exceeded, then the model may be placed into service for providing recommendations to general system users 102. In some examples, if the success rate is less than the predetermined success threshold, then the system 108 continues to solicit feedback from users 102, which is received by the feedback learning engine 148 and applied to the respective machine learning data models to improve their recommendation accuracy. In some implementations, outside of the testing phase when the system 108 is in general use, the system 108 can also receive feedback from general system users 102, which can be similarly used to refine and retrain machine learning data models.

Figure 7:
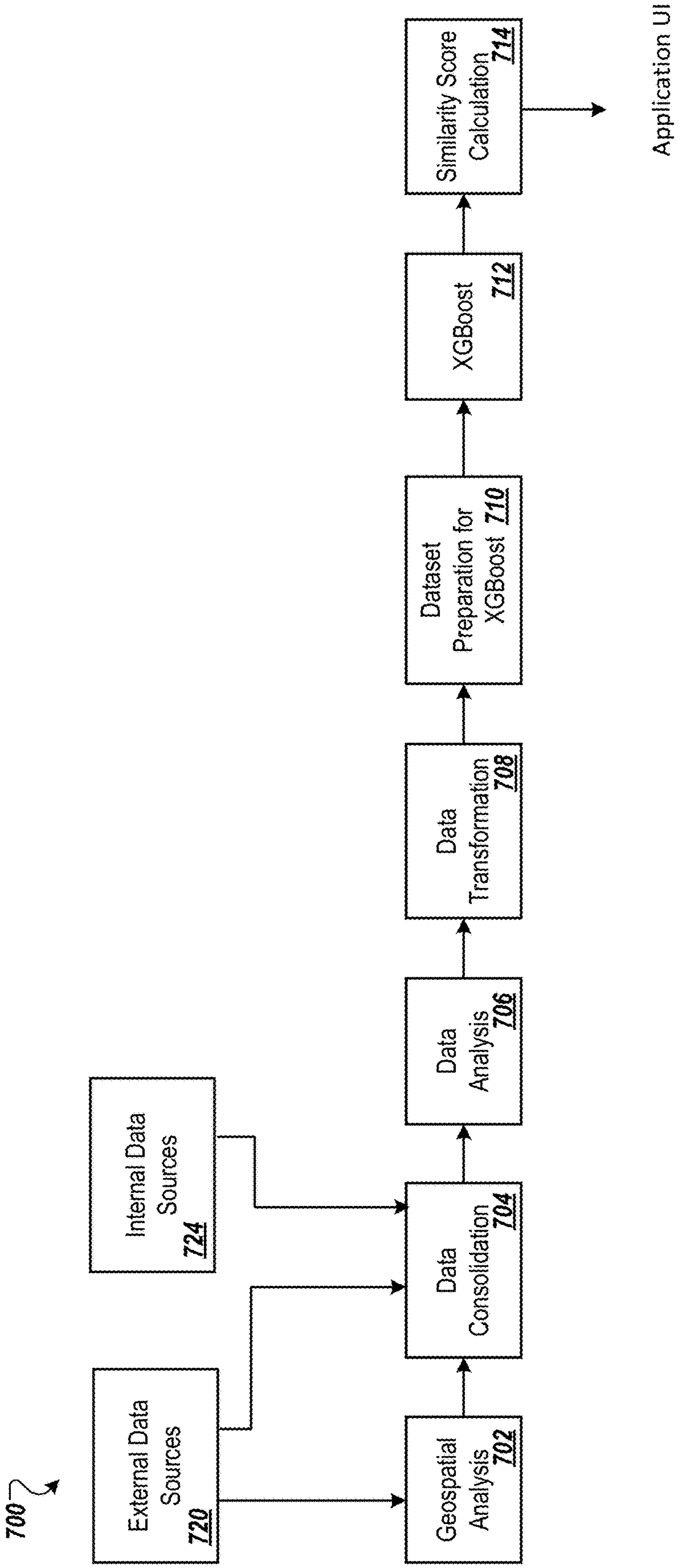
FIG. 7 illustrates a work flow diagram for an example similarity score modeling process.

FIG. 7 illustrates a work flow diagram for an example similarity score modeling process 700. In some examples, the work flow diagram shown in FIG. 7 is a high-level view of the processes illustrated by the flow charts in FIGS. 10-13. In some implementations, the process 700 uses both physical property conditions and location conditions to generate a metric/score to measure the similarity between two commercial real estate properties with respect to a measurable property attribute, such as rent, expense, or value. Additionally, the process 700 can accommodate mixed type datasets to generate reasonable variable weights under an XGBoost framework. Further, the process 700 can use an advanced analytical algorithm to model the cognitive behavior and reasoning performed by real estate professionals when they compare properties, so that the data and the variable weights can be combined in a comprehensive way to generate appropriate scores. However, the analytical algorithm is able to remove human bias and lack of full knowledge in a way that humans are unable to do. In addition, different models can be used for different practices.

For rent comparables, the similarity score generation engine 134 can calculate property similarity score, which considers unit type level characteristics and property-level conditions. Then, the similarity score generation engine 134 calculates a neighborhood score between two properties, measured by differences in location conditions. Each neighborhood is defined as a Census tract for some location variables, and defined as a radius (e.g., 0.3 miles for NYC) for other location variables. Lastly, the minimum of property similarity score and neighborhood similarity score is another similarity score between two properties.

For expense comparables, because expenses are measured at the property level, the data set used in the XGBoost framework to generate variable importance is a property-level dataset. After the importance weights are calculated, the similarity score generation engine 134 calculates the property-level property similarity score between two properties, measured by differences in physical conditions. In addition, expenses can be much less sensitive to location conditions and thus, within one region, we use property similarity score as the final similarity score between two properties.

The process 700 can include a geospatial analysis stage 702 that relates location features to property-level data based on geospatial data received from external data sources 720. At a data consolidation stage 704, data from internal and external data sources 720, 724 is merged together as property-level data, and the system 108 consolidates both physical property condition data and neighborhood condition data so that one similarity score can be calculated. In some implementations, at a data analysis stage 706, the system 108 performs an exploratory data analysis and correlation analysis of the consolidated data. At data transformation stage 708, data transformation engine 142 can transform variables of mixed type datasets to generate reasonable outcomes. Additionally, the data transformation engine 142 can bucket variables based on quantitative analysis and business knowledge. At dataset customization stage 710, the system 108 can customize the consolidated data sets for the particular calculations and comparisons performed by the similarity score generation engine 134 (e.g., rent comps, expense comps). Further, the system 108 applies a Python XGBoost package 712 in preparation for executing the similarity score calculation algorithm 714. Calculated similarity scores 114 can be stored in data repository 110.

Figure 2:
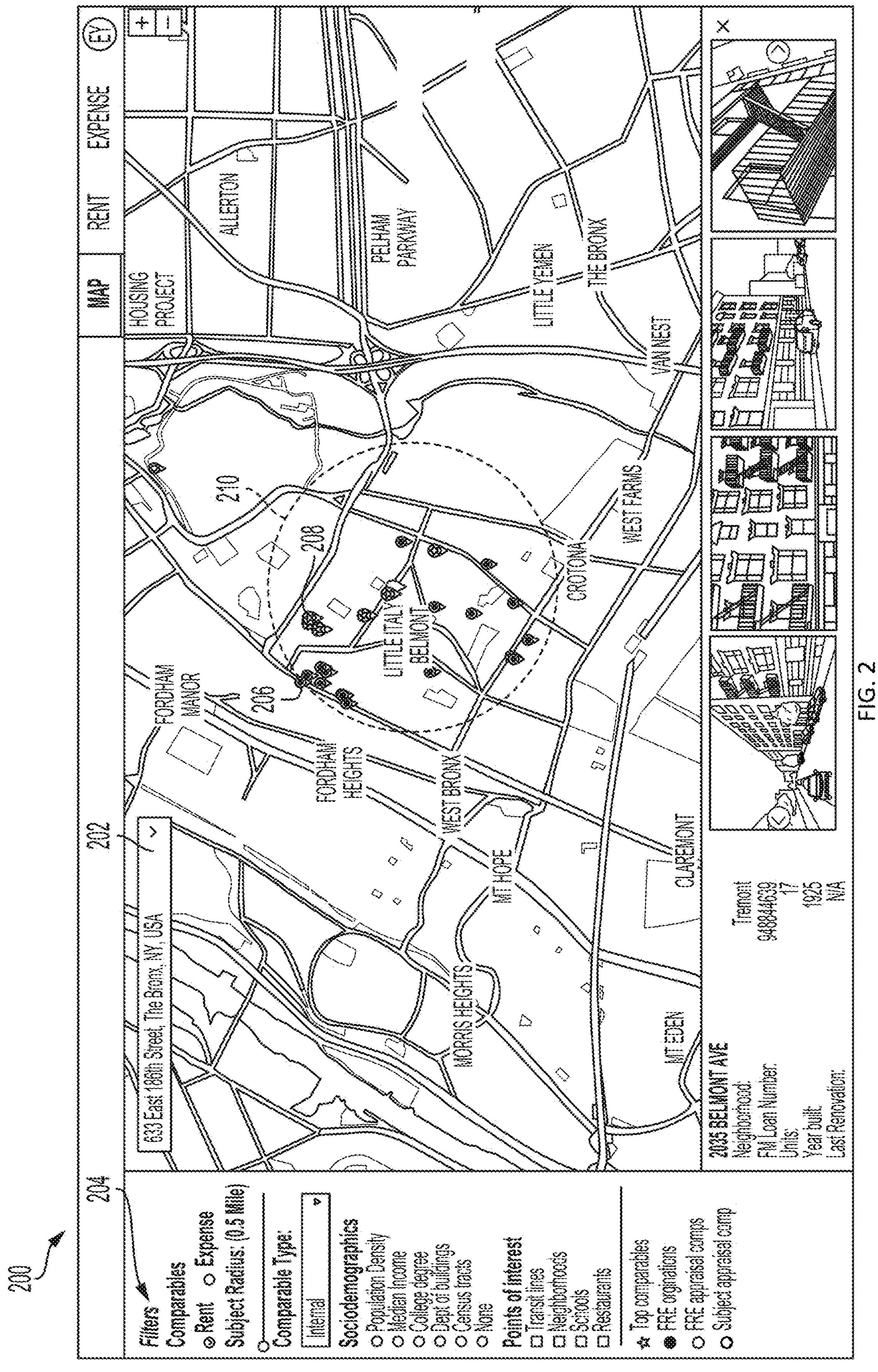
FIG. 2 illustrates an example interactive map user interface screen.

Returning to FIG. 1, the property comparison system 108 can include a user interface engine 146 that generates, prepares, and presents user interface screens to users 102 in response to submitting a comp analysis query. In another implementation, the user interface engine 146 may be external to the property comparison system 108 yet still communicate with the property comparison system 108 via a network to receive data presented to a user at one or more user interface screens. FIG. 2 illustrates an example interactive map user interface screen 200 generated by user interface engine 146 that functions as a landing page for interacting with the system 108. The user interface screen 200 is layered with internal and external data sources (e.g. various points of interests, Freddie Mac origination data, sociodemographic, etc.) uniquely combined for their analytical aggregation. In some examples, a search functionality 202 provided in the user interface screen 200 can be powered by a third party (e.g., Google) but offers functionality only used by internal servers and systems for a loan provider or government sponsored enterprise like Freddie Mac (e.g. search by loan number). Users 102 can also search by other geographic names (city, state etc.) The users 102 can specify the types of the analysis they are running such as rental comps or expense comps. The users 102 can also specify one or more filtering criteria 204 including whether they prefer to limit the comps pool to only those properties financed by a particular loan provider and/or purchaser or if they also would like to see external comparables. Multicolored markers on the map identify the subject property and all available comparables within a set radius for easy location analysis.

As users 102 click on various markers 206 in the user interface screen 200, they can review similarity scores, key characteristics and exterior and interior pictures for the respective properties that are unique to a loan purchaser or provider. The markers for the best comps for any given property are identified with a star symbol 208. The best comps can be defined as the properties with the highest similarity scores within a given radius 210. The default number of best comps (e.g., top 5 versus top 10) can be changed by users 102 depending on the specific needs of their analysis. The best comps form a core comparison set that is subsequently used to benchmark a subject property's performance.

Figure 3A:
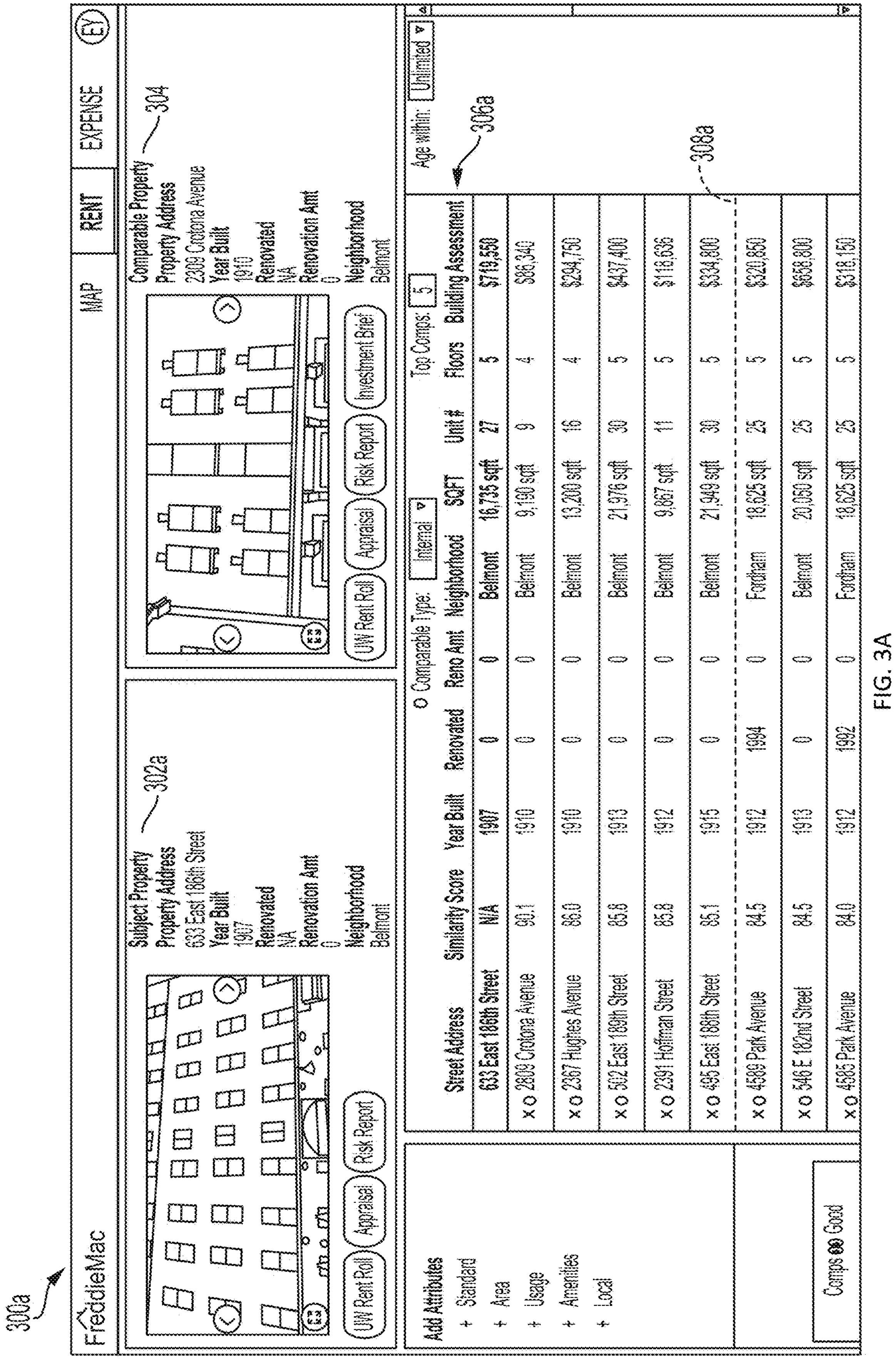
FIGS. 3A and 3B illustrate example rent comp analysis user interface screens.

Another user interface screen generated by user interface engine 146 is a rent comp analysis user interface screen 300*a*, shown in FIG. 3A. In some implementations, the user interface screen 300*a* can be customized for rental comps analysis. The user interface screen 300*a* can supply additional information for the properties that fell within the defined radius 210 on the map of the interactive map user interface screen 200 shown in FIG. 2. In some examples, there are two sections for users 102 to review a subject property's 302*a* and comparable properties' 304 pictures in bigger format. In some implementations, subject property section 302*a* can include one or more appraisal photos of the subject property as well as summary information for the property (e.g., address, year built, renovation date, renovation amount, neighborhood). In some examples, the user interface screen 300 can also include a tabular section 306*a* that presents a broad collection of data elements for the properties being compared. This data comes from various internal and external data sources (e.g., internal data sources 104 and external sources 106 stored in data repository 110) and is presented in a searchable/sortable table format with users being able to add or remove any attribute they prefer. The default sorting within the tabular section 306*a* is based on rent comparison model similarity scores. The properties with the higher scores (the top comps set) are visually separated from the rest of the properties within the table by a divider line 308*a*. Users 102 are provided with the functionality to add/remove the comps to/from the top comps set based on their review of related data and documents. Once the user confirms the top comps set has been finalized, the app takes the user 102 to rent results user interface screen 400 shown in FIG. 4.

Figure 3B:
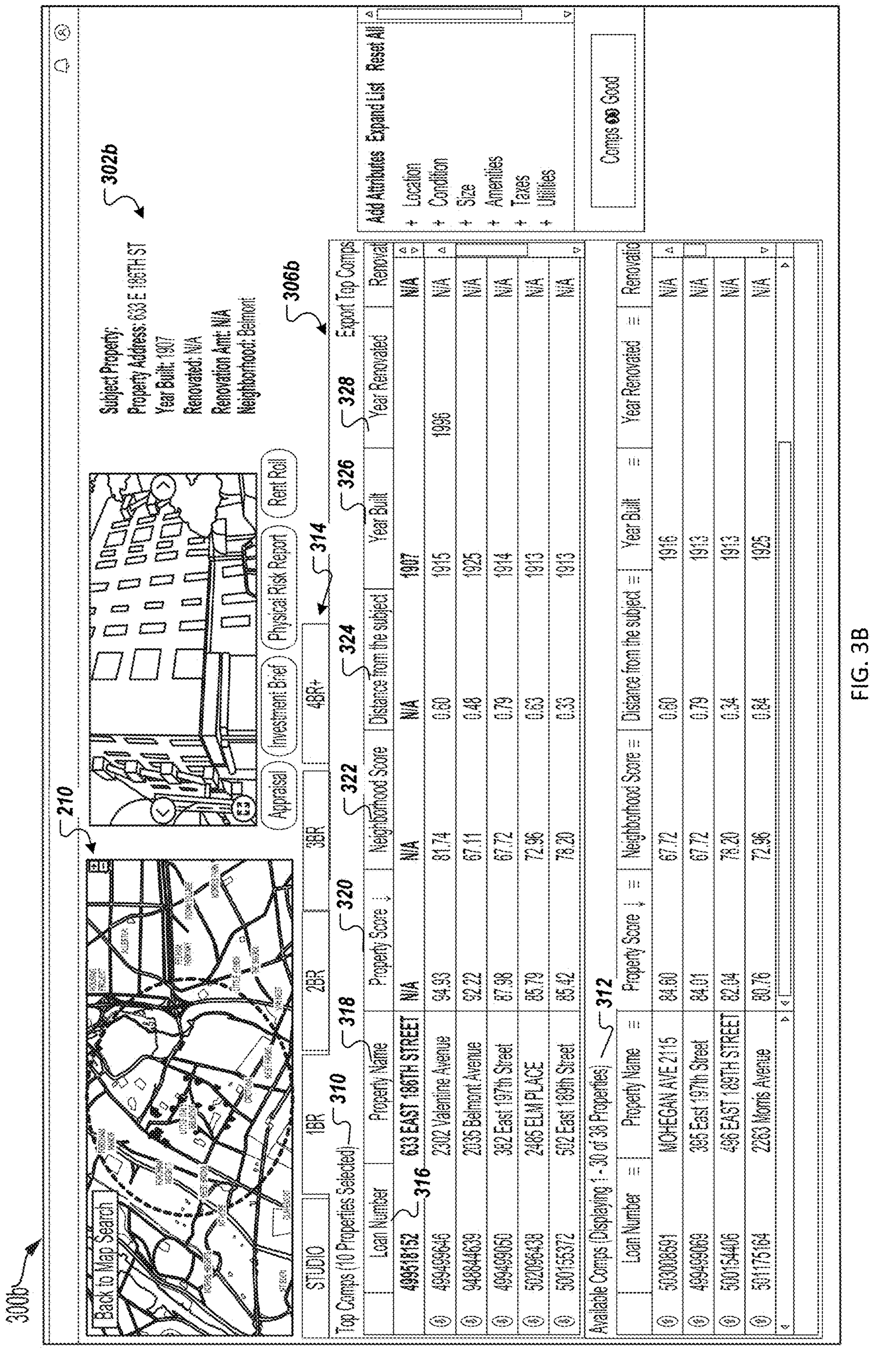

In some implementations, FIG. 3B illustrates another example of rent comp analysis user interface screen 300*b*. In some examples, the user interface screen 300*b* can display the properties within the defined radius 210 on the map displayed within user interface screen 200 (FIG. 2) and a detail section 302*b* for the subject property. In some implementations, subject property section 302*b* can include one or more appraisal photos of the subject property as well as summary information for the property (e.g., address, year built, renovation date, renovation amount, neighborhood). In addition, the user interface screen 300*b* can include a tabular section 306*b* that presents a broad collection of data elements for the properties being compared. In some aspects, the tabular section 306*b* includes one or more tabs 314 that allow a user to select results by unit type (e.g., studio, 1BR, 2BR, 3BR, 4BR+). displayed. For example, the system 108 can generate similarity scores for properties with respect to unit type so that users can obtain more refined results based on the type of units available in a given property. For each property displayed within tabular section 306*b*, one or more property details such as loan number 316, property address 318, property similarity score 320, neighborhood similarity score 322, distance from the subject property 324, year built 326, and/or year renovated 328 may be In some implementations, each of the properties identified within the tabular section 306*b* is selectable, and upon selection, additional details for the comp may be displayed. In one example, the tabular section 306*b* includes a first sub-section 310 that displays a predetermined number of properties that are ranked according to rent similarity score for the property. In one example, the first sub-section displays the top five ranked properties. In a second sub-section 312, other available comps within a predetermined radius of the subject property 302*b* may be displayed and may be ranked in order of property similarity score.

Figure 4:
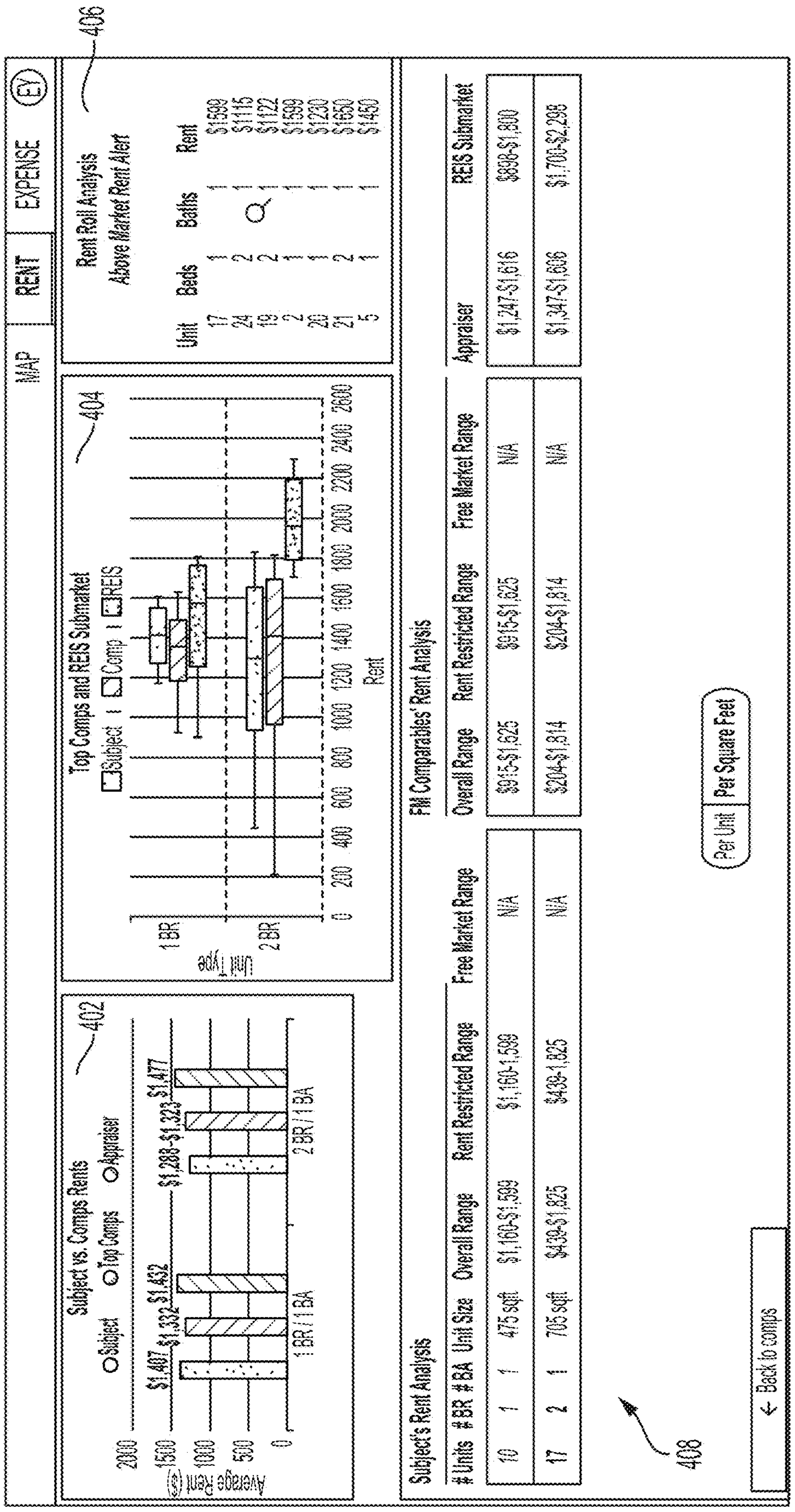
FIG. 4 illustrates an example rent results user interface screen.

In some implementations, the rent results user interface screen 400 shown in FIG. 4 presents a variety of rent summary statistics for the subject property and the comparable properties in the top set above divider line 308. In particular, the rent results user interface screen 400 can present various charts 402, 404 that compare the subject property's rents to the comparable properties' rents as well as to the other common benchmarks within the industry (multifamily data vendors, approved appraisal, etc.). The rent results user interface screen 400 can also include a tabular presentation 408 of the comparisons shown in the charts 402, 404. In some examples, the app, via the user interface engine 146, automatically highlights any material deviations between the subject property and the comps. Various hover over messages direct users' attention to the outliers and recommend potential course of action. In some examples, there is also a Rent Roll section 406 where the rents for all units at the subject property are color-coded based on the magnitude of their deviation from the top comps set. Hover over messages in this section 406 contain recommendations on how users can address material outliers. The users 102 have the ability to export the summaries from the rent results user interface screen 400 so they can be utilized in various approval/investment summary documents outside of the application.

Figure 5B:
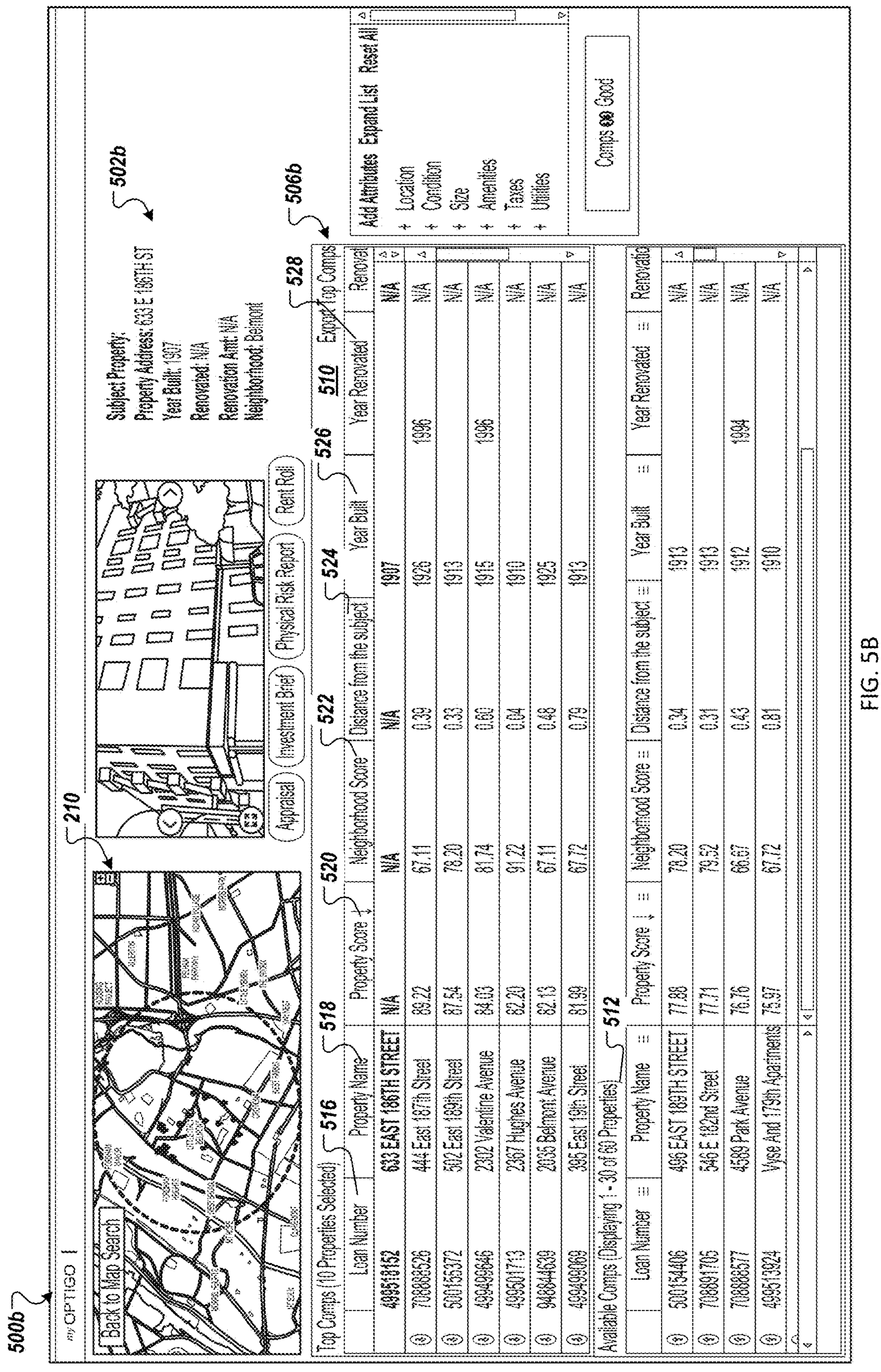

In some implementations, the user interface engine 146 can also present an expense analysis user interface screen 500*a* to external devices 158 of users 102 as shown in FIG. 5B. The user interface screen 500*a* can be customized for expense comparables analysis. The overall functionality can be very similar to the rent analysis user interface screen 300*a*. Some default settings are different, to better account for the specifics of expense analysis. In one example, the user interface screen 500*a* can also include two sections for users 102 to review subject property's 502*a* and comparable properties' 504 pictures in bigger format. In some implementations, subject property section 502*a* can include one or more appraisal photos of the subject property as well as summary information for the property (e.g., address, year built, renovation date, renovation amount, neighborhood). The default sorting within comparables table 506*a* can be based on expense comparison similarity scores. The process flow at the expense analysis user interface screen 500*a* can also be similar to the process flow at the rent analysis user interface screen 300*a*. Users 102 can modify the top expense comps set based on their review of relevant data and documents. Once the top set is finalized, the app takes the user to expense results user interface screen 600*a,b* shown in FIGS. 6A-6B.

FIG. 5B shows another example of an expense analysis user interface screen 500*b*. The overall functionality can be very similar to the rent analysis user interface screen 300*b*. In some examples, the user interface screen 500*b* can display the properties within the defined radius 210 on the map displayed within user interface screen 200 (FIG. 2) and a detail section 502*b* for the subject property. In some implementations, subject property section 502*b* can include one or more appraisal photos of the subject property as well as summary information for the property (e.g., address, year built, renovation date, renovation amount, neighborhood). For each property displayed within tabular section 506*b*, one or more property details such as loan number 516, property address 518, property similarity score 520, neighborhood similarity score 522, distance from the subject property 524, year built 526, and/or year renovated 528 may be displayed. In some implementations, each of the properties identified within the tabular section 506*b* is selectable, and upon selection, additional details for the comp may be displayed. In one example, the tabular section 306*b* includes a first sub-section 510 that displays a predetermined number of properties that are ranked according to expense similarity score for the property. In one example, the first sub-section displays the top five ranked properties. In a second sub-section 512, other available comps within a predetermined radius of the subject property may be displayed and may be ranked in order of property similarity score.

In some implementations, the expense results user interface screen 600*a* shown in FIG. 6A presents comparisons of a subject property's historical and forecasted expenses to those presented by the comps within the top set (e.g., above divider line 508 in user interface screen 500*a*). Expense data comes from financial statements provided to loan purchasers or providers at the point of underwriting as well as from the financials supplied by the property operators to loan servicers. The app automatically highlights any material deviations between the subject. In some examples, the user interface screen 600*a* can include a first section 602*a* that displayed underwritten expenses for comps, a second section 604*a* that displays servicing expenses for comps, and a third section 606*a* that displays a delta or difference between the underwriting versus servicing expenses. In some implementations, the users 102 are able to create a new expense pro forma for the subject right within the page. As various expense categories are entered or modified on this pro forma, the app color-codes them depending on how they compare to the comp ranges. Various hover over messages direct users' attention to the outliers and recommend potential course of action. Users 102 also can export the summaries from user interface screen 600*a* so they can be utilized outside of the application.

FIG. 6B shows another example of an expense results user interface screen 600*b*. In some implementations, the information displayed within user interface screen 600*b* is similar to the information displayed within user interface screen 600*a*. For example, the user interface screen may include a section 602*b* that displays underwritten expenses for comps and another section 604*b* that displays servicing expenses for comps. In addition, the user interface screen 600*b* can also include a subject property expense section 608 that displays expense information for the subject property over predetermined time periods. In some embodiments, the user interface screen 600*b* can also include a user input 614 that allows a user to toggle between viewing expense data per unit or per square feet.

Figure 17:
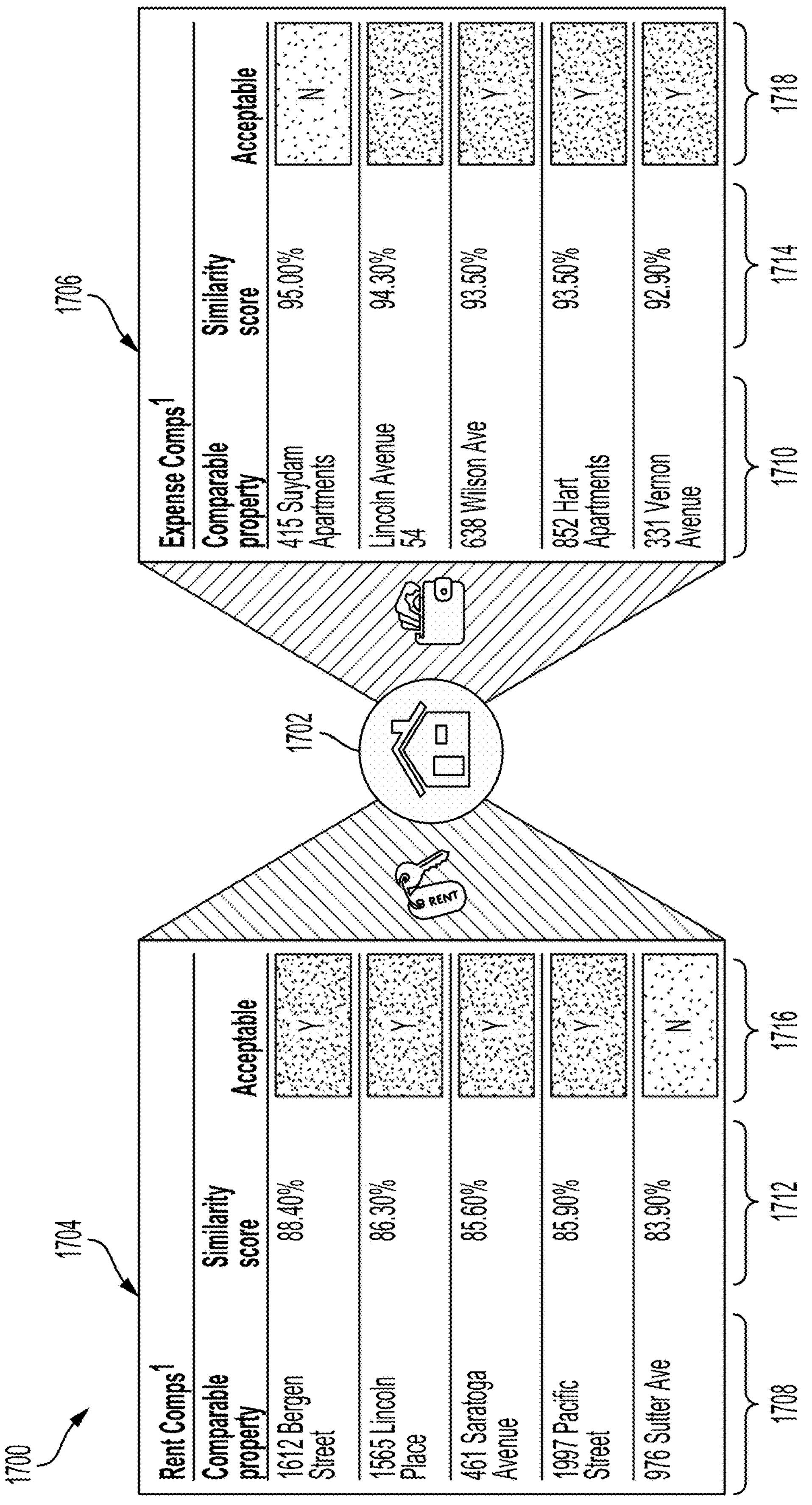
FIG. 17 illustrates outputs generated by a property comparison system.

Turning to FIG. 17, output results 1700 generated by a property comparison system are illustrated. In some implementations, in response to receiving a request for a similarity score determination from a user 102 for property 1700, the property comparison system 108 generates a set of rent comparables 1704 and a set of expense comparables 1706 for presenting to the user 102. For example, for each of the rent comparables 1704, a respective address 1708 and similarity score 1712 is displayed. Similarly, for each of the expense comparables 1706, a respective address 1710 and similarity score 1714 is displayed. In some examples, each of the listed rent comparables 1705 and expense comparables 1706 can be selectable by the user 102 at the user interface screen 1700, which causes additional details for the respective property to be viewed by the user 102. Upon viewing the property details, the user 102 may indicate at feedback sections 1716, 1718 which of the presented comparables is an acceptable comparable property for the property 1702, which can be incorporated by the system 108 to retrain and refine the machine learning data models so that the accuracy of similarity score calculations can be improved. For example, in the expense feedback section 1718, the property with the highest similarity score of the group (95%) was flagged as being "not acceptable" while all the other properties were deemed "acceptable" by the user 102. For the rent comparables 1704, the property with the lowest similarity score was flagged as being "not acceptable" while all the other properties with higher similarity scores were "acceptable."

Figure 14:
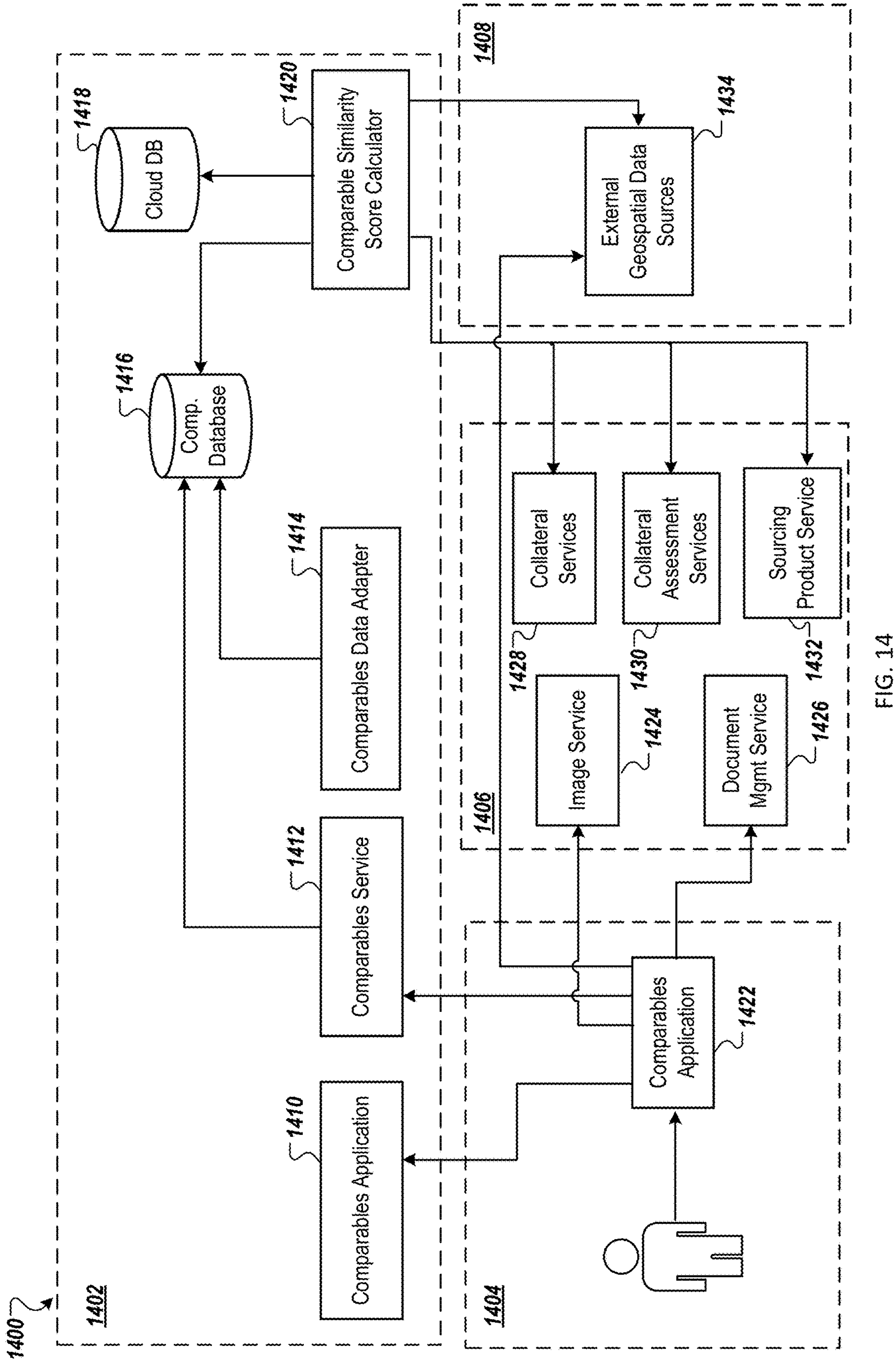
FIG. 14 illustrates a diagram of a data architecture for a comparable property platform.

Turning to FIG. 14, a data architecture for aspects of a comparable property platform 1400 is illustrated. In some implementations, the platform 1400 can be an example implementation of the system 108 shown in FIG. 1. The platform 1400, in some examples, can include a comparables engine 1402 that includes a comparables application 1410, comparables service 1412, comparables data adapter 1414, and comparables similarity score model/algorithm 1420. In some embodiments, comparables application 1410 generates user interfaces and interactive experience that are presented at an application interface 1422 on an end user device 1404. For example, via application interface 1422, an end user can select comparable properties and view similarity scores at an external device. In some examples, the comparables application 1410 interacts with representational state transfer (REST) API to allow all applicable to be displayed within the application. In some implementations, the comparables application 1422 provides each user with a customized experience in response to user interactions with the application 1422.

In some examples, comparables service 1412 provides third-party data vendor APIs to search for a subject property and its comparable properties based on rent and expense comparisons in response to a user query received via the application. In one example, the comparables service 1412 uses comparables database 1416 as the data source for properties and analytical information presented at the comparables application interface 1422. In addition, comparables application 1422 can receive information from internal data sources 1406 such as image service 1424 (for example, an API for delivering property photos to be displayed within a UI screen) and document management service 1426 and external data sources 1408 such as geospatial data sources 1434 for configuring user interface screens at an application interface. In some embodiments, comparables similarity score calculator 1420 ingests data from internal data sources 1406 (e.g., collateral services 1428, collateral assessment services 1430, and sourcing product services 1432 that includes loan information and property photos) and external data sources 1408 (e.g., external geospatial data sources 1434 such as Google Places), processes and transform the ingested data, and calculates rent and expense similarity scores for the queried property. The processes performed by similarity score model/algorithm can correspond to those performed by analytics engine 144, data transformation engine 142, missing data engine 152, feature selection engine 150, and similarity score generation engine 134 of the property comparison system 108 of FIG. 1. In some examples, comparables data adapter 1414 performs database initialization and data extraction for comparables database 1416. In some embodiments, comparables engine 1402 can also include a cloud database 1418, such as the Amazon Web Services S3 service, that provides a conduit for ingesting data to the comparables engine 1402 from external data sources 1408.

In some embodiments, the comparable property platform 1400 can be integrated with other computing platforms in an underwriting and/or risk evaluation system. For example, the comparable similarity score model/algorithm can complement other risk analysis and loan processing tools for both SBLs and other loan products.

Figure 10:
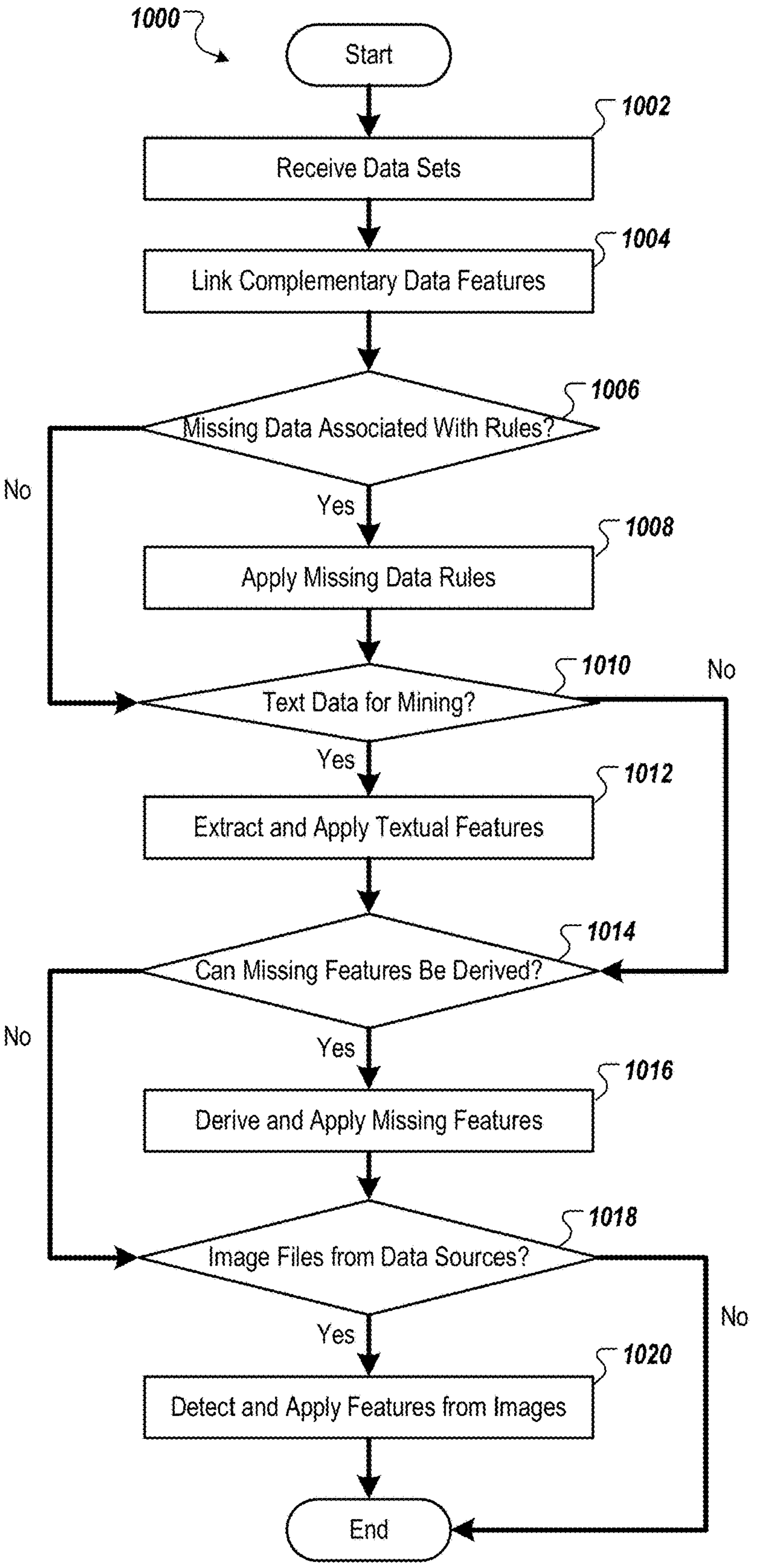
FIG. 10 is a flow chart of an example method of filling or amplifying missing data.

Turning to FIGS. 10-13, flowcharts of processes performed by property comparison system 108 are illustrated. The order in which the flow charts are described does not necessarily indicate the order in which the processes are performed. For example, method 1000 shown in FIG. 10 may be performed before or after method 1100 shown in FIG. 11. Additionally, the method 1200 shown in FIG. 12 may be performed before or after the method of FIG. 11. For example, FIG. 10 shows a flow chart of an example method 1000 for filling in or amplifying missing data features in property data sets. In some examples, the method 1000 is performed at least in part by missing data engine 152 of the system 108.

In some implementations, the method 1000 commences with receiving feature data sets of internal and external data 111, 112 (1002). In some examples, the data sets may be grouped according to applicable output variable (e.g., rent or expense) and associated region for a particular regional similarity score model (e.g., city, county, state, region).

In some examples, if there are complementary features from multiple data sources certain features of external data 112 can be identified that best complement particular features of internal data 111, and these complementary features can be linked together to fill in one or more missing feature entries (1004). For example, both collected property level data and Pluto (for New York City properties) include renovation date and build year. In some examples, if there are any missing data features associated with any missing data rules 120 (1006), then missing data engine 152 can apply the missing data rules to fill in those features (1008). For example, default values can be applied for certain features when those features are missing from the data sets. For example, if "parking garage" or "elevator" features are missing, the missing feature engine 152 may apply values of "O" to those features.

In some implementations, if any internal or external data 111, 112 include any text files or textual data fields that can be mined for information (1010), then in some examples, missing feature engine 152 can extract textual features from the text files and data fields and apply those features to respective missing feature data entries (1012). For example, OUS data includes a data filed for "property comments" that may include details about a laundry facility on site. In one example, the missing feature engine 152 may extract text such as "laundry room" or "in-unit laundry" to determine whether a property includes a laundry feature or not.

In some embodiments, if missing features can be derived from other features (1014), then in some example, the missing feature engine 152 can impute missing data from another available feature based on a correlation between the features (1016). For example, a building floor number can be inferred from a first value of a unit number. In some embodiments, if any of the data source files include image files (1018), one or more image processing sub-engines of missing feature engine 152 can detect and impute missing features from image files from one or more internal data sources 111 such as photos in appraisal files (1020). For example, the image processing sub-engine may be configured to detect the presence of certain missing features by detecting those features within appraisal photos (e.g., laundry room features such as washers, dryers, and deep sinks). The image processing sub-engine may also be able to detect changes in property images that may be indicative of property degradation or renovations, which can be used to determine renovation year of a property.

Although illustrated in a particular series of events, in other implementations, the steps of the missing data derivation process 1000 may be performed simultaneously or in a different order. For example, any of the techniques for deriving missing data features can be applied in any order (e.g., text data mining and application (1012) may be performed with application of missing data rules (1008)). Further, one or more of the missing data derivation techniques may be omitted from the process (e.g., detecting features from image files (1020)). Additionally, in other embodiments, the process may include more or fewer steps while remaining within the scope and spirit of the missing data amplification process 1000.

Turning to FIG. 11, a flow chart of an example method 1100 for identifying correlated features and weighting values for measuring comparable similarity is illustrated. In some examples, the method 1100 is performed at least in part by feature selection engine 150 and analytics engine 144 of the system 108.

In some implementations, the method 1100 commences with receiving feature data sets (1102). In some examples, the feature data sets can include raw internal and external data 111, 112 or data sets that have had missing data filled in by missing data amplification process 1000. If more than a threshold percentage of features are missing in the feature data sets for properties (1104), then in some examples, any of the features that fall below the threshold percentage are dropped from the analysis (1106). In one example, the threshold percentage is 50%. Further, if variation for at least one feature is less than a predetermined percentage (1108), then in some examples, the at least one feature is also dropped from the feature set (1110). In one example, the feature variation threshold percentage is 10%.

In some implementations, the feature selection engine 150 can calculate feature correlations to group highly correlated features into the same categorical division or bucket (1112). In one example, the correlation analysis is a Pearson correlation analysis. In some examples, a portion of the features in each bucket can be selected for use by the system 108 in determining rent and expense comparables (1114). In some implementations, a feature for each bucket that has a highest correlation with an outcome variable (e.g., rent or expense) is selected as the feature for a respective bucket. In some implementations, the bucketed data population is filtered to remove data entries that have missing values for many property features (1116). In one example, only properties with certain core property attributes (e.g., unit size and number of units) are retained for analysis. Additionally, any property information associate with loans that are dead deals or have not yet passed the transfer to purchase phase of origination are removed from the data population.

In some implementations, analytics engine 144 runs a machine learning process on the filtered data population features to further identify features used for similarity score calculations (1118). In some examples, the feature data sets are used to train machine learning data models, which determines the features and weights that are the most predictive of comparable properties. In some examples, the features having the lowest weighting values are dropped from the analysis (e.g., the features having weights that are less than a predetermined threshold or features that fall within a lowest percentage of weights). In other examples, the identified features and weights are presented to a user (e.g., an underwriter or other subject matter expert) who flags one or more features for removing from the analysis. In some examples, if any features are identified for dropping (1120), then those features are removed from the analysis (1122), and the machine learning feature identification process is performed again. In some examples, feature selection can be an iterative process that continues until all features have importance weights that are greater than a predetermined threshold or fall within a predetermined range (1124).

Although illustrated in a particular series of events, in other implementations, the steps of the feature identification and weighting process 1100 may be performed simultaneously or in a different order. For example, removal of features that are missing at greater than a threshold rate (1104, 1106) may be performed after or simultaneously with removal of features that have less than a threshold rate of variation (1108, 1110). Additionally, in other embodiments, the process may include more or fewer steps while remaining within the scope and spirit of the feature identification and weighting process 1100.

Figure 12:
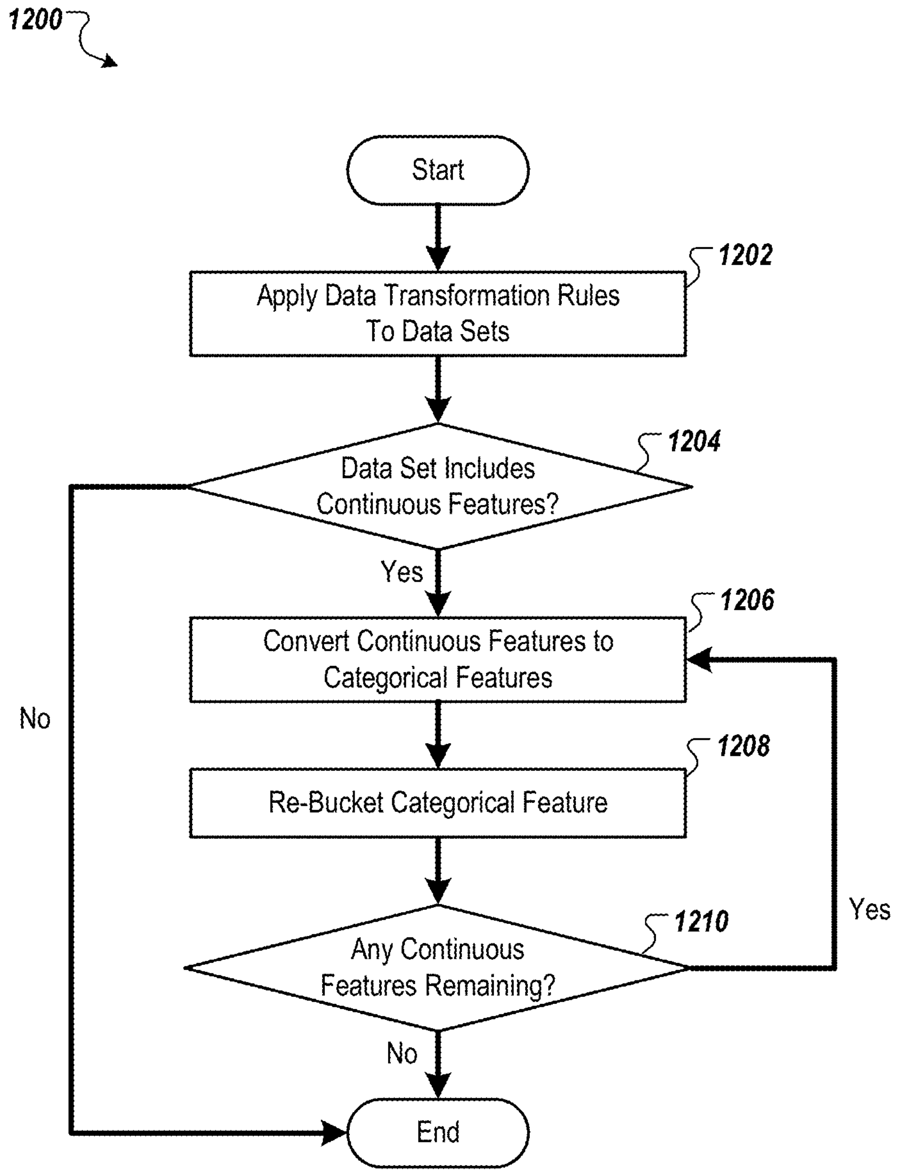
FIG. 12 is a flow chart of an example method of performing data transformations.

Turning to FIG. 12, an example method 1200 for performing data transformation of feature sets is illustrated. In some examples, at least a portion of the method 1200 may be performed by data transformation engine 142 of property comparison system 108. In some embodiments, data transformation engine 142 produces data structures that capture relationships between observed property features and property quality to most accurately measure similarity between properties by transforming raw data received from internal and external data sources 111, 112 into meaningful features.

In some implementations, the method 1200 commences with applying data transformation rules 122 to a feature data set for one or more multifamily properties (1202). The data sets can include features from internal and external data sources 111, 112. In some examples, the feature data sets have been augmented with missing data features by the method 1000 described above (FIG. 10). In some aspects, the data transformation rules can transform raw data into normalized data values. For example, instead of using unit rent as an outcome variable, the system 108 calculates "rent per square foot (sqft)" because it may better reveal the property quality. In another example, instead of using a dummy variable for each of the amenities, the data transformation engine 142 can combine amenity features together to calculate the total number of amenities for a property. Other examples include, but are not limited to, calculating renovation amount per unit in place of total building renovation amount, calculating the ratio of commercial area to residential area in place of including both commercial and residential areas, and, for each neighborhood, calculating population density, instead of using total population.

In some implementations, if the data sets include continuous data values (1204), data transformation engine 142 can also convert continuous value features into categorical features, which improves overall processing efficiency and accuracy (1206). For example, for almost all continuous features, a relationship between a given feature value and property quality is not continuous. For example, because renovation approaches, trends, and styles change and age, a property renovated within in 2 years may not considered different from another property renovated within 3 years. However, a property renovated within 5 years may be considered with better quality than another property renovated 6 years ago. Thus, a categorical feature "renovated_date_category" may be created, which has a value of 0 if a property is renovated within 5 years; has a value of 1 if a property is renovated 6-10 years ago; has a value of 2 if a property is renovated 11-20 years ago; and has a value of 3 if a property is renovated more than 20 years ago. In another example, unit square footage can be categorized based on a range of square foot values (e.g., 500-750 sqft, 751-1000 sqft, 1000-1250 sqft, etc.).

In some examples, data transformation engine 142 re-buckets or classifies categorical features to categorical buckets or divisions (1208). In some implementations, some property features may be assigned to the wrong buckets based on raw data values, which can result in biased importance weights for these features. To correct the importance weights of these features, the data transformation engine 142 re-bucket the categorical into more appropriate categories. For example, for raw data, a feature for "property overall quality" may 9 categories: 1 (poor); 2 (Fair); 3 (Average); 4 (Good); 5 (Excellent); 6 (Excellent); 7 (Above Average); 8 (Average); 9 (Below Average); 10 (Inferior). In some examples, some of these categories may have very few data observations assigned to each bucket, and some categories may represent substantially similar property quality. Applying the original overall quality data from the raw data to the machine learning process may generate a very small weight due to these data bucketing issues even though property quality may be very important to determining comparable property similarity. To boost the weight of this feature to a level that accurately represents the importance of the property quality feature, this feature may be bucketed into three categories: "Above Average" if the original value is 4, 5, 6, or 7; "Average" if the original value is 2, 3, or 8; and "Below Average" if the original value is 1 or 9. This data transformation and re-classifying into buckets helps ensure that the importance weight of this feature increases and has a greater impact on the comparable analysis. In some examples, the data transformation engine 142 performs these re-bucketing procedures based on feedback received from subject matter experts from underwriters. These data transformations and classifications also account for outliers, which may be grouped into a first bucket or a last bucket for the feature. In some examples, the method 1200 continues until all continuous features have been converted into categorical features (1210).

Although illustrated in a particular series of events, in other implementations, the steps of the data transformation process 1200 may be performed simultaneously or in a different order. For example, application of transformation rules to data sets (1202) may be performed after or simultaneously with converting continuous features to categorical features (1206). Additionally, in other embodiments, the process may include more or fewer steps while remaining within the scope and spirit of the data transformation process 1200.

Figure 13:
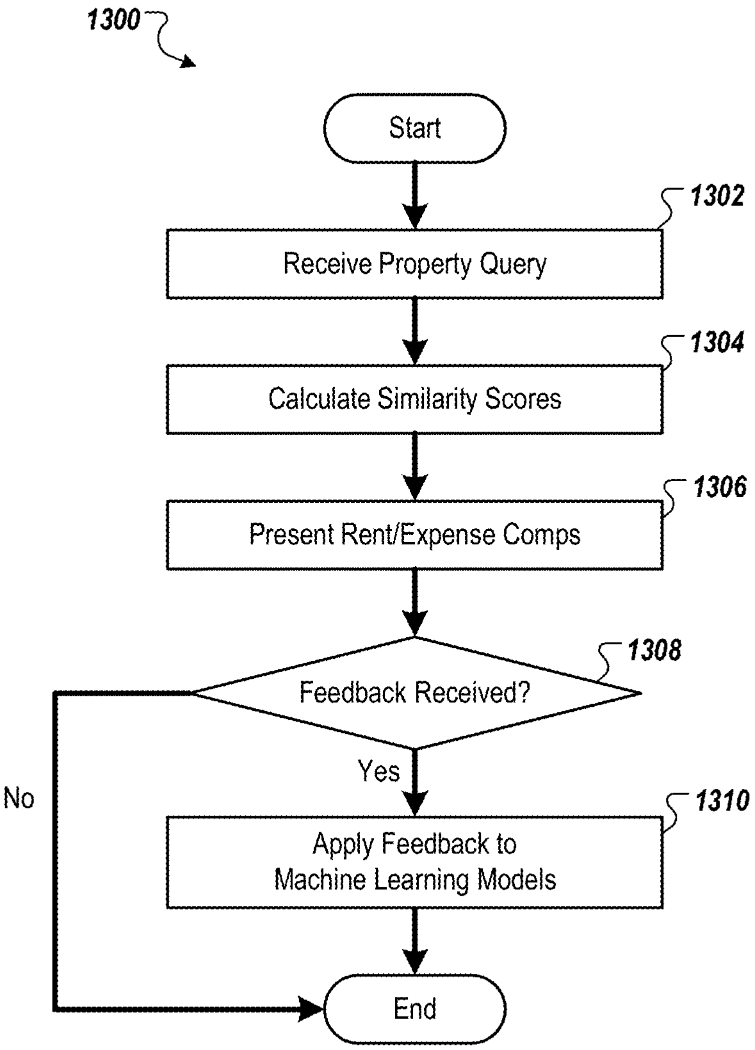
FIG. 13 is a flow chart of an example method of generating comparable property recommendations.

Turning to FIG. 13, a flow chart for an example method 1300 of generating comparable property recommendations is illustrated. At least a portion of the method 1300 may be performed by similarity score generation engine 134, feedback learning engine 148, and user interface engine 146.

In some implementations, the method 1300 commences with user interface engine 146 receiving a query for a comparable property analysis (1302). The query may be received from an end user (e.g., underwriter) requesting a set of rent and expense comps for a subject property. In another example, the query may be received from a backend system administrator or subject matter expert testing the accuracy of recommendations generated by the system.

In some examples, responsive to receiving a comp recommendation query, similarity score generation engine 134 calculates similarity scores for rent and/or expense output variables for the one or more subject properties based on the feature variables and weights output by the trained machine learning data models (1304). Using the output features and weights, neighborhood features and their weights are used to calculate a neighborhood similarity score, which measures a difference in two neighborhoods where comparable properties reside. For rent comparables, the data models and similarity scores account for unit type level characteristics and property-level conditions. This allows the system 108 to generate property-level similarity scores at unit-type level. In some examples, for expense comparables, because expenses are measured on a property-level only and expense comparisons are much less sensitive to neighborhood conditions, expense similarity scores are calculated using property-level physical features. In some examples, the similarity score generation engine 134 applies a Gower distance algorithm to calculate a multi-dimensional geometry distance between any pair of properties, using the selected feature and their feature importance. In some examples, the similarity score generation engine 134 may apply the Gower distance algorithm to calculate different types of similarity scores for a given property. For example, the similarity score generation engine 134 may calculate similarity scores for a property level, neighborhood level, and/or unit type level associated with the subject property.

In some implementations, user interface engine 146 outputs one or more comparable properties for the subject property to the user 102 via one or more user interface screens (1306). In one example, the user interface engine 146 may output a number of highest-ranking comparable properties with respect to rent and expense output variables. For example, user interface screens 300*a,b* in FIGS. 3A and 3B display the top-ranking rent comparables, and user interface screens 500*a, b* in FIGS. 5A and 5B display the top-ranking expense comparables.

Although illustrated in a particular series of events, in other implementations, the steps of the comparable property recommendation process 1300 may be performed simultaneously or in a different order. Additionally, in other embodiments, the process may include more or fewer steps while remaining within the scope and spirit of the comparable property recommendation process 1200. For example, in one example, feedback steps (1308, 1310) may be omitted from the process.

In some embodiments, the user interface screens may allow the user viewing the results to provide feedback regarding whether the recommended comparable properties are accurate comparable properties. If the user submits feedback to the system 108 (1308), then in some examples, feedback learning engine 148 incorporates the received feedback to further train and refine machine learning algorithms used by analytics engine 144 to provide more accurate results (1310). In some example, users 102 (e.g., underwriters, system backend administrators) provide feedback regarding the quality of system-identified comparable properties based on calculated similarity scores, and this feedback is used to refine and/or retrain the machine learning data models. In one example, the user-provided feedback can evaluate competencies such as whether any similarity score model-selected comps are useful to an underwriter or whether the system has produced enough similarity score-model selected comps.

In some embodiments, the implementations described herein can be further refined through an iterative process of building and testing the customized algorithms and using the testing results to improve the algorithms. In addition, the implementations described herein can be expanded to cover nationwide regions and to cover various loan types. For example, while the implementations described herein describe calculating similarity scores for multi-family SBL properties, other types of properties and loan types can also be included. The iterative system can be applied for every region, every loan type, and every practice. The implementations described herein can also be applied in other applications or industries. For example, the system 108 can be used by other industry professionals (e.g., servicers, lenders, landlords, borrowers) that need to perform property comparison (e.g., for purchase, benchmarking, underwriting, property management, securitization, investing). Tenants looking for similar commercial and residential real estate buildings, rating agencies and investors to evaluate securitization collateral, and insurance agents estimating insurance premiums for real estate assets.

Figure 8:
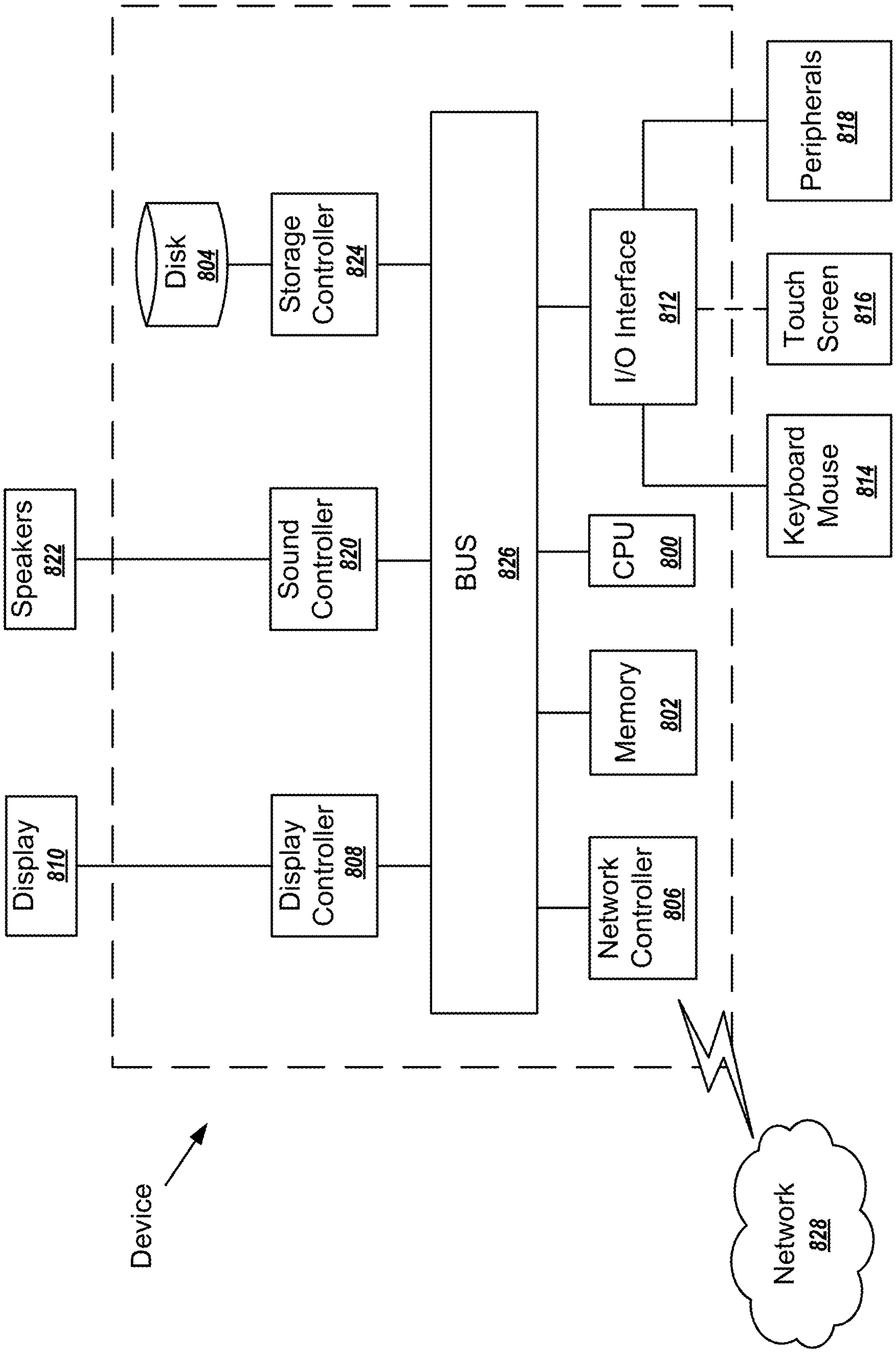
FIG. 8 is a block diagram of an example computing system.

Next, a hardware description of a computing device, mobile computing device, computing system, or server according to exemplary embodiments is described with reference to FIG. 8. The computing device, for example, may represent the users 102, external data sources 106, or one or more computing systems supporting the functionality of the property comparison system 108, as illustrated in FIG. 1. In FIG. 8, the computing device, mobile computing device, or server includes a CPU 800 which performs the processes described above. The process data and instructions may be stored in memory 802. The processing circuitry and stored instructions may enable the computing device to perform, in some examples, the methods 700 of FIG. 7. These processes and instructions may also be stored on a storage medium disk 804 such as a hard drive (HDD) or portable storage medium or may be stored remotely. Further, the claimed advancements are not limited by the form of the computer-readable media on which the instructions of the inventive process are stored. For example, the instructions may be stored on CDs, DVDs, in FLASH memory, RAM, ROM, PROM, EPROM, EEPROM, hard disk or any other information processing device with which the computing device, mobile computing device, or server communicates, such as a server or computer. The storage medium disk 804, in some examples, may store the contents of the data repository 110 of FIG. 1, as well as the data maintained by the users 102, and external data sources 106 prior to accessing by the property comparison system 108 and transferring to the data repository 110.

Further, a portion of the claimed advancements may be provided as a utility application, background daemon, or component of an operating system, or combination thereof, executing in conjunction with CPU 800 and an operating system such as Microsoft Windows, UNIX, Solaris, LINUX, Apple MAC-OS and other systems known to those skilled in the art.

CPU 800 may be a Xeon or Core processor from Intel of America or an Opteron processor from AMD of America, or may be other processor types that would be recognized by one of ordinary skill in the art. Alternatively, the CPU 800 may be implemented on an FPGA, ASIC, PLD or using discrete logic circuits, as one of ordinary skill in the art would recognize. Further, CPU 800 may be implemented as multiple processors cooperatively working in parallel to perform the instructions of the inventive processes described above.

The computing device, mobile computing device, or server in FIG. 8 also includes a network controller 806, such as an Intel Ethernet PRO network interface card from Intel Corporation of America, for interfacing with network 828. As can be appreciated, the network 828 can be a public network, such as the Internet, or a private network such as an LAN or WAN network, or any combination thereof and can also include PSTN or ISDN sub-networks. The network 828 can also be wired, such as an Ethernet network, or can be wireless such as a cellular network including EDGE, 3G, 4G, and 5G wireless cellular systems. The wireless network can also be Wi-Fi, Bluetooth, or any other wireless form of communication that is known. The network 828, for example, may support communications between the property comparison system 108 and any one of the users 102 or external data sources 106.

The computing device, mobile computing device, or server further includes a display controller 808, such as a NVIDIA GeForce GTX or Quadro graphics adaptor from NVIDIA Corporation of America for interfacing with display 810, such as a Hewlett Packard HPL2445w LCD monitor. A general purpose I/O interface 812 interfaces with a keyboard and/or mouse 814 as well as a touch screen panel 816 on or separate from display 810. General purpose I/O interface also connects to a variety of peripherals 818 including printers and scanners, such as an OfficeJet or DeskJet from Hewlett Packard. The display controller 808 and display 810 may enable presentation of user interfaces for submitting requests to the property comparison system 108.

A sound controller 820 is also provided in the computing device, mobile computing device, or server, such as Sound Blaster X-Fi Titanium from Creative, to interface with speakers/microphone 822 thereby providing sounds and/or music.

The general purpose storage controller 824 connects the storage medium disk 804 with communication bus 826, which may be an ISA, EISA, VESA, PCI, or similar, for interconnecting all of the components of the computing device, mobile computing device, or server. A description of the general features and functionality of the display 810, keyboard and/or mouse 814, as well as the display controller 808, storage controller 824, network controller 806, sound controller 820, and general purpose I/O interface 812 is omitted herein for brevity as these features are known.

One or more processors can be utilized to implement various functions and/or algorithms described herein, unless explicitly stated otherwise. Additionally, any functions and/or algorithms described herein, unless explicitly stated otherwise, can be performed upon one or more virtual processors, for example on one or more physical computing systems such as a computer farm or a cloud drive.

Reference has been made to flowchart illustrations and block diagrams of methods, systems and computer program products according to implementations of this disclosure. Aspects thereof are implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

Moreover, the present disclosure is not limited to the specific circuit elements described herein, nor is the present disclosure limited to the specific sizing and classification of these elements. For example, the skilled artisan will appreciate that the circuitry described herein may be adapted based on changes on battery sizing and chemistry or based on the requirements of the intended back-up load to be powered.

Figure 9:
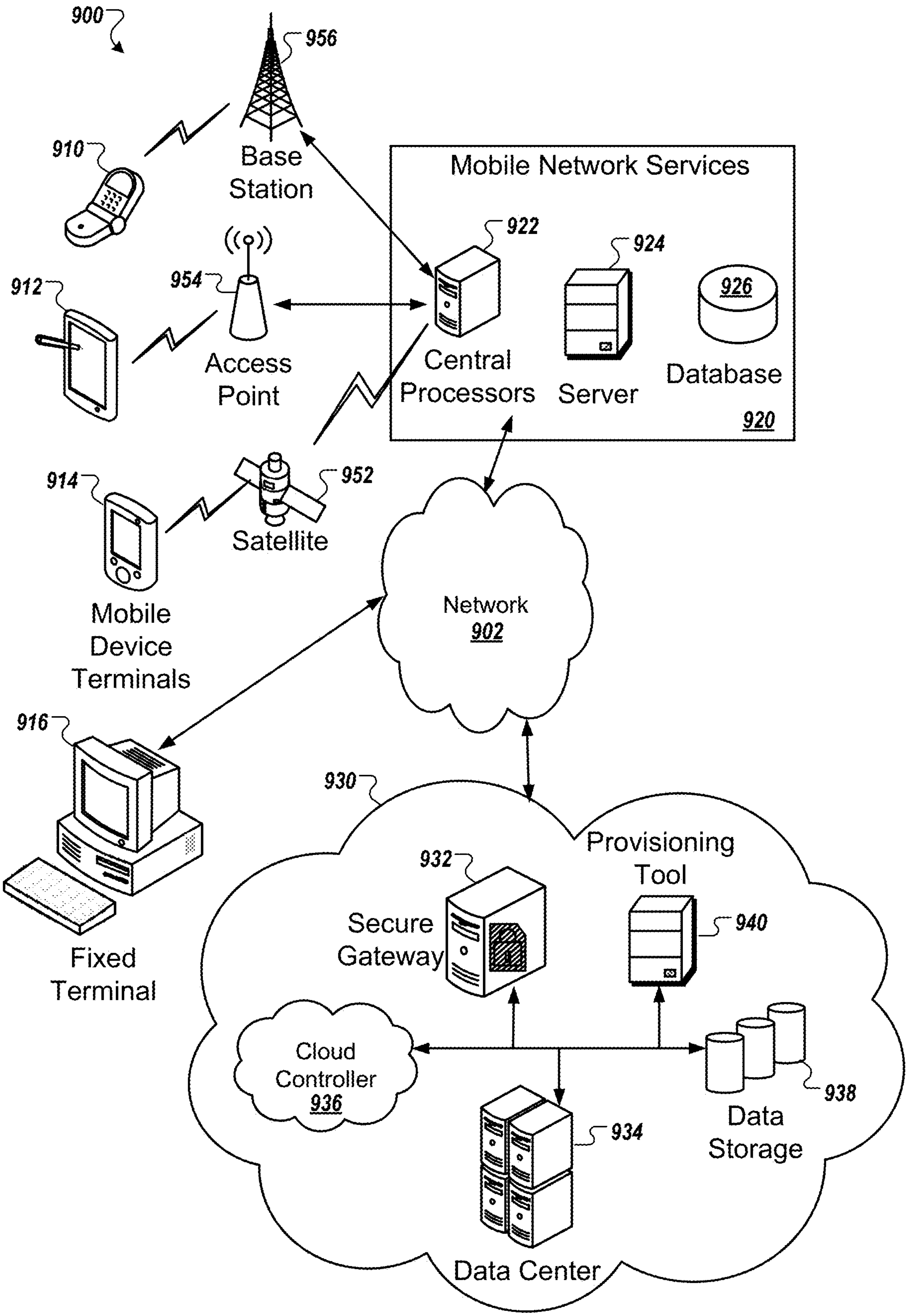
FIG. 9 is a block diagram of an example distributed computing environment including a cloud computing environment.

The functions and features described herein may also be executed by various distributed components of a system. For example, one or more processors may execute these system functions, wherein the processors are distributed across multiple components communicating in a network. The distributed components may include one or more client and server machines, which may share processing, as shown on FIG. 9, in addition to various human interface and communication devices (e.g., display monitors, smart phones, tablets, personal digital assistants (PDAs)). The network may be a private network, such as a LAN or WAN, or may be a public network, such as the Internet. Input to the system may be received via direct user input and received remotely either in real-time or as a batch process. Additionally, some implementations may be performed on modules or hardware not identical to those described. Accordingly, other implementations are within the scope that may be claimed.

In some implementations, the computing devices described herein may interface with a cloud computing environment 930, such as Google Cloud Platform™ to perform at least portions of methods or algorithms detailed above. The processes associated with the methods described herein can be executed on a computation processor, such as the Google Compute Engine by data center 934. The data center 934, for example, can also include an application processor, such as the Google App Engine, that can be used as the interface with the systems described herein to receive data and output corresponding information. The cloud computing environment 930 may also include one or more databases 938 or other data storage, such as cloud storage and a query database. In some implementations, the cloud storage database 938, such as the Google Cloud Storage, may store processed and unprocessed data supplied by systems described herein. For example, internal data 111, external data 112, similarity scores 114, combined data 116, feature data and weights 118, missing data rules 120, and data transformation rules 122 may be maintained by the property comparison system 108 of FIG. 1 in a database structure such as the databases 938.

The systems described herein may communicate with the cloud computing environment 930 through a secure gateway 932. In some implementations, the secure gateway 932 includes a database querying interface, such as the Google BigQuery platform. The data querying interface, for example, may support access by the property comparison system 108 to data stored on any one of the users 102.

The cloud computing environment 930 may include a provisioning tool 940 for resource management. The provisioning tool 940 may be connected to the computing devices of a data center 934 to facilitate the provision of computing resources of the data center 1234. The provisioning tool 940 may receive a request for a computing resource via the secure gateway 932 or a cloud controller 936. The provisioning tool 940 may facilitate a connection to a particular computing device of the data center 934.

A network 902 represents one or more networks, such as the Internet, connecting the cloud environment 930 to a number of client devices such as, in some examples, a cellular telephone 910, a tablet computer 912, a mobile computing device 914, and a desktop computing device 916. The network 902 can also communicate via wireless networks using a variety of mobile network services 920 such as Wi-Fi, Bluetooth, cellular networks including EDGE, 3G, 4G, and 5G wireless cellular systems, or any other wireless form of communication that is known. In some examples, the wireless network services 920 may include central processors 922, servers 924, and databases 926. In some embodiments, the network 902 is agnostic to local interfaces and networks associated with the client devices to allow for integration of the local interfaces and networks configured to perform the processes described herein. Additionally, external devices such as the cellular telephone 910, tablet computer 912, and mobile computing device 914 may communicate with the mobile network services 920 via a base station 956, access point 954, and/or satellite 952.

Reference throughout the specification to "one embodiment" or "an embodiment" means that a particular feature, structure, or characteristic described in connection with an embodiment is included in at least one embodiment of the subject matter disclosed. Thus, the appearance of the phrases "in one embodiment" or "in an embodiment" in various places throughout the specification is not necessarily referring to the same embodiment. Further, the particular features, structures or characteristics may be combined in any suitable manner in one or more embodiments. Further, it is intended that embodiments of the disclosed subject matter cover modifications and variations thereof.

It must be noted that, as used in the specification and the appended claims, the singular forms "a," "an," and "the" include plural referents unless the context expressly dictates otherwise. That is, unless expressly specified otherwise, as used herein the words "a," "an," "the," and the like carry the meaning of "one or more." Additionally, it is to be understood that terms such as "left," "right," "top," "bottom," "front," "rear," "side," "height," "length," "width," "upper," "lower," "interior," "exterior," "inner," "outer," and the like that may be used herein merely describe points of reference and do not necessarily limit embodiments of the present disclosure to any particular orientation or configuration.

Furthermore, terms such as "first," "second," "third," etc., merely identify one of a number of portions, components, steps, operations, functions, and/or points of reference as disclosed herein, and likewise do not necessarily limit embodiments of the present disclosure to any particular configuration or orientation.

Furthermore, the terms "approximately," "about," "proximate," "minor variation," and similar terms generally refer to ranges that include the identified value within a margin of 20%, 10% or preferably 5% in certain embodiments, and any values therebetween.

All of the functionalities described in connection with one embodiment are intended to be applicable to the additional embodiments described below except where expressly stated or where the feature or function is incompatible with the additional embodiments. For example, where a given feature or function is expressly described in connection with one embodiment but not expressly mentioned in connection with an alternative embodiment, it should be understood that the inventors intend that that feature or function may be deployed, utilized or implemented in connection with the alternative embodiment unless the feature or function is incompatible with the alternative embodiment.

While certain embodiments have been described, these embodiments have been presented by way of example only and are not intended to limit the scope of the present disclosures. Indeed, the novel methods, apparatuses and systems described herein can be embodied in a variety of other forms; furthermore, various omissions, substitutions and changes in the form of the methods, apparatuses and systems described herein can be made without departing from the spirit of the present disclosures. The accompanying claims and their equivalents are intended to cover such forms or modifications as would fall within the scope and spirit of the present disclosures.

What is claimed is:

1. A system for identifying relationships between property features and property quality, the system comprising:

a non-transitory computer readable medium storing a plurality of feature data sets, each feature data set corresponding to a respective property of a plurality of properties, wherein each respective feature data set of the plurality of feature data sets comprises a plurality of feature values corresponding to a plurality of features, wherein the plurality of feature values comprises a cost value and a geographic area value, a first subset of the plurality of features represents physical attributes of the respective property, and a second subset of the plurality of features represents neighborhood attributes of a surrounding region of the respective property, and each given feature data set of at least a portion of the plurality of feature data sets includes one or more feature values of the plurality of feature values representing an unknown value due to lack of information pertaining to a corresponding feature of the plurality of features in relation to the respective property; and one or more processors configured to perform a plurality of operations, the plurality of operations comprising identifying, among the plurality of feature data sets, a first at least one respective feature of the plurality of features as having the unknown value in at least a threshold portion of the plurality of feature data sets, identifying, among the plurality of feature data sets, a second at least one respective feature of the plurality of features as having less than a threshold percentage of variation in a respective feature value of the second at least one respective feature across the plurality of feature data sets, creating, from the plurality of feature data sets, a plurality of filtered feature data sets, each feature set of the plurality of filtered feature sets comprising a plurality of retained features of the plurality of features by filtering the first at least one respective feature and the second at least one respective feature from the plurality of features of each feature set of the plurality of feature sets, training a first at least one machine learning model with the plurality of filtered feature data sets, wherein the first at least one machine learning model is configured to identify a first set of correlation weights comprising a respective weight corresponding to each respective feature of the plurality of retained features, wherein the respective weight represents relative importance of the respective feature to determining property quality, obtaining, from the first at least one machine learning model, the first set of correlation weights, refining the first set of correlation weights by i) selecting a subset of the plurality of retained features, each retained feature of the subset of the plurality of retained features having a corresponding correlation weight of the first set of correlation weights above a predetermined threshold value, ii) filtering the plurality of filtered feature data sets to remove values corresponding to all features excluded from the subset of the plurality of retained features, iii) training a second at least one machine learning model with the plurality of filtered feature data sets, wherein the second at least one machine learning model is configured to identify a second set of correlation weights comprising a respective weight corresponding to each respective feature of the subset of the plurality of retained features, iv) obtaining, from the second at least one machine learning model, a refined set of correlation weights, and v) repeating steps i) through iv) until all correlation weights of the refined set of correlation weights are above the predetermined threshold value, conducting a model testing phase, comprising identifying a subject property and a plurality of potentially comparable properties, for each respective comparable property of the plurality of potentially comparable properties, calculating, using the respective correlation weight of the refined set of correlation weights corresponding to each feature of the subset of the plurality of retained features, a plurality of subject property feature values corresponding to the subset of the plurality of retained features of the subject property, and a respective plurality of comparable property feature values corresponding to the subset of the plurality of retained features of the respective comparable property, at least one respective similarity score between the subject property and the respective comparable property, based on the respective similarity scores between the subject property and the plurality of potentially comparable properties, selecting at least one comparable property of the plurality of potentially comparable properties for presentation to a user of a remote computing device, and responsive to presenting the at least one comparable property at the remote computing device, receiving, from the remote computing device, feedback regarding a level of acceptability of one or more comparable properties of the at least one comparable property, determining, based on the feedback, whether a recommendation accuracy is below a predetermined threshold, and responsive to the recommendation accuracy being below the predetermined threshold, applying the feedback to retrain the second at least one machine learning model, thereby customizing the second at least one machine learning model according to the model testing phase to improve the recommendation accuracy.

2. The system of claim 1, wherein training the first at least one machine learning model comprises:

training a first one or more machine learning models using a first portion of the plurality of filtered feature data sets representing rental properties of the plurality of properties; and training a second one or more machine learning models using a second portion of the plurality of filtered feature data sets representing cost properties of the plurality of properties.

3. The system of claim 1, wherein identifying the subject property comprises receiving, from the remote computing device, a query for property analysis identifying the subject property.

4. The system of claim 1, wherein identifying the plurality of potentially comparable properties comprises identifying, from the plurality of properties, the plurality of potentially comparable properties within a threshold geographic distance from the subject property.

5. The system of claim 1, wherein calculating the at least one respective similarity score comprises:

calculating, using a portion of the subset of the plurality of retained features representing the physical attributes, a respective physical similarity score of the at least one respective similarity score; and calculating, using a portion of the subset of the plurality of retained features representing the neighborhood attributes, a respective neighborhood similarity score of the at least one respective similarity score.

6. The system of claim 1, wherein the plurality of operations further comprises generating the plurality of feature data sets by:

obtaining, from a plurality of data sources, a plurality of raw data values representing characteristics of the plurality of properties; and transforming, for at least a portion of the plurality of features, a respective raw data value of each respective property of at least a portion of the plurality of properties to the respective feature value of the respective property.

7. The system of claim 6, wherein transforming the respective raw data value for one or more features of the portion of the plurality of features comprises normalizing, across the plurality of properties, at least one expense value, wherein:

the at least one expense value comprises at least one of a rent or a sales price; and normalizing the at least one expense value comprises deriving an expense per square foot value.

8. The system of claim 6, wherein transforming the respective raw data value the respective raw data value for the portion of the plurality of features comprises classifying at least one continuous feature of the portion of the plurality of features to a set of categorical divisions.

9. The system of claim 8, wherein the at least one continuous feature comprises one or more of a renovation date or a square footage.

10. The system of claim 6, wherein transforming the respective raw data value for the portion of the plurality of features comprises re-classifying at least one category-based feature of the portion of the plurality of features to a reduced set of categorical divisions.

11. The system of claim 10, wherein re-classifying the at least one category-based feature comprises performing a correlation analysis to group highly correlated feature values into a same categorical division of the reduced set of categorical divisions.

12. The system of claim 1, wherein training the first at least one machine learning model comprises training at least one machine learning model per respective geographic region of a plurality of geographic regions using a respective portion of the plurality of filtered feature data sets having the respective geographic area value corresponding to the respective geographic region.

13. The system of claim 1, wherein the plurality of operations further comprises generating a plurality of missing data values, each respective missing data value corresponding to a respective unknown value in a respective feature data set of the plurality of feature data sets.

14. The system of claim 13, wherein generating the plurality of missing data values comprises deriving a portion of the plurality of missing data values using, for each respective feature data set of a subset of the plurality of feature data sets, one or more known values of the respective feature data set.

15. The system of claim 1, wherein the plurality of operations further comprises illustrating a respective location of each comparable property of the at least one comparable property on an interactive graphical map presented at the remote computing device.

16. A method for identifying relationships between property features and property quality, the method comprising:

accessing, by processing circuitry, a plurality of feature data sets, wherein each feature data set corresponds to a respective property of a plurality of properties, wherein each respective feature data set of the plurality of feature data sets comprises a plurality of feature values corresponding to a plurality of features, wherein the plurality of feature values comprises a cost value and a geographic area value, a first subset of the plurality of features represents physical attributes of the respective property, and a second subset of the plurality of features represents neighborhood attributes of a surrounding region of the respective property, and each given feature data set of at least a portion of the plurality of feature data sets includes one or more feature values of the plurality of feature values representing an unknown value due to lack of information pertaining to a corresponding feature of the plurality of features in relation to the respective property;

by the processing circuitry, identifying, among the plurality of feature data sets, a first at least one respective feature of the plurality of features as having the unknown value in at least a threshold portion of the plurality of feature data sets;

by the processing circuitry, identifying, among the plurality of feature data sets, a second at least one respective feature of the plurality of features as having less than a threshold percentage of variation in a respective feature value of the second at least one respective feature across the plurality of feature data sets;

creating, by the processing circuitry from the plurality of feature data sets, a plurality of filtered feature data sets, each feature set of the plurality of filtered feature data sets comprising a plurality of retained features of the plurality of features by filtering the first at least one respective feature and the second at least one respective feature from the plurality of features of each feature set of the plurality of feature data sets;

training, by the processing circuitry, a first at least one machine learning model with the plurality of filtered feature data sets, wherein the first at least one machine learning model is configured to identify a first set of correlation weights comprising a respective weight corresponding to each respective feature of the plurality of retained features, wherein the respective weight represents relative importance of the respective feature to determining property quality;

obtaining, from the first at least one machine learning model, the first set of correlation weights;

refining, by the processing circuitry, the first set of correlation weights by i) selecting a subset of the plurality of retained features, each retained feature of the subset of the plurality of retained features having a corresponding correlation weight of the first set of correlation weights above a predetermined threshold value, ii) filtering the plurality of filtered feature data sets to remove values corresponding to all features excluded from the subset of the plurality of retained features, iii) training a second at least one machine learning model with the plurality of filtered feature data sets, wherein the second at least one machine learning model is configured to identify a second set of correlation weights comprising a respective weight corresponding to each respective feature of the subset of the plurality of retained features, iv) obtaining, from the second at least one machine learning model, a refined set of correlation weights, and v) repeating steps i) through iv) until all correlation weights of the refined set of correlation weights are above the predetermined threshold value;

conducting, by the processing circuitry, a model testing phase, comprising identifying a subject property and a plurality of potentially comparable properties for each respective comparable property of the plurality of potentially comparable properties, calculating, using the respective correlation weight of the refined set of correlation weights corresponding to each feature of the subset of the plurality of retained features, a plurality of subject property feature values corresponding to the subset of the plurality of retained features of the subject property, and a respective plurality of comparable property feature values corresponding to the subset of the plurality of retained features of the respective comparable property, at least one respective similarity score between the subject property and the respective comparable property, based on the respective similarity scores between the subject property and the plurality of potentially comparable properties, selecting at least one comparable property of the plurality of potentially comparable properties for presentation to a user of a remote computing device, and responsive to presenting the at least one comparable property at the remote computing device, receiving, from the remote computing device, feedback regarding a level of acceptability of one or more comparable properties of the at least one comparable property;

determining, by the processing circuitry based on the feedback, whether a recommendation accuracy is below a predetermined threshold; and responsive to the recommendation accuracy being below the predetermined threshold, applying, by the processing circuitry, the feedback to retrain the second at least one machine learning model, thereby customizing the second at least one machine learning model according to the model testing phase to improve the recommendation accuracy.

17. The method of claim 16, wherein training the first at least one machine learning model comprises:

training a first one or more machine learning models using a first portion of the plurality of filtered feature data sets representing rental properties of the plurality of properties; and training a second one or more machine learning models using a second portion of the plurality of filtered feature data sets representing cost properties of the plurality of properties.

18. The method of claim 16, wherein calculating the at least one respective similarity score comprises:

calculating, using a portion of the subset of the plurality of retained features representing the physical attributes, a respective physical similarity score of the at least one respective similarity score; and calculating, using a portion of the subset of the plurality of retained features representing the neighborhood attributes, a respective neighborhood similarity score of the at least one respective similarity score.

19. The method of claim 16, further comprising generating, by the processing circuitry, the plurality of feature data sets by:

obtaining, from a plurality of data sources, a plurality of raw data values representing characteristics of the plurality of properties; and transforming, for at least a portion of the plurality of features, a respective raw data value of each respective property of at least a portion of the plurality of properties to the respective feature value of the respective property.

20. The method of claim 16, further comprising generating, by the processing circuitry, a plurality of missing data values, each respective missing data value corresponding to a respective unknown value in a respective feature data set of the plurality of feature data sets.

* * * * *